US008865847B2

(12) United States Patent
Hoang et al.

(10) Patent No.: US 8,865,847 B2
(45) Date of Patent: Oct. 21, 2014

(54) REACTOR OPERABILITY IN A GAS PHASE POLYMERIZATION PROCESS

(75) Inventors: Peter Phung Minh Hoang, Calgary (CA); Benjamin Milton Shaw, Calgary (CA); Andy Mak, Calgary (CA)

(73) Assignee: Nova Chemicals (International) S.A, Fribourg (CH)

( * ) Notice: Subject to any disclaimer, the term of this patent is extended or adjusted under 35 U.S.C. 154(b) by 0 days.

(21) Appl. No.: 13/450,679

(22) Filed: Apr. 19, 2012

(65) Prior Publication Data

US 2013/0296507 A1 Nov. 7, 2013

(30) Foreign Application Priority Data

May 11, 2011 (CA) .................................... 2739969

(51) Int. Cl.
| | | |
|---|---|---|
| *C08F 4/6592* | (2006.01) | |
| *C08F 4/649* | (2006.01) | |
| *C08F 210/02* | (2006.01) | |
| *C08F 210/14* | (2006.01) | |
| *C08F 210/16* | (2006.01) | |
| *C08F 4/659* | (2006.01) | |

(52) U.S. Cl.
CPC ........... *C08F 210/14* (2013.01); *C08F 4/65916* (2013.01); *C08F 210/16* (2013.01); *C08F 2410/02* (2013.01); *C08F 2420/04* (2013.01); *C08F 4/6592* (2013.01); *C08F 4/65912* (2013.01); *Y10S 526/943* (2013.01)
USPC ........... 526/135; 526/146; 526/147; 526/160; 526/161; 526/165; 526/348; 526/943

(58) Field of Classification Search
CPC ...... C08F 4/649; C08F 4/6494; C08F 4/6495; C08F 4/6496; C08F 4/6592; C08F 4/65912; C08F 210/02
USPC ......... 526/135, 146, 147, 160, 161, 165, 348, 526/943
See application file for complete search history.

(56) References Cited

U.S. PATENT DOCUMENTS

| | | |
|---|---|---|
| 3,248,179 A | 4/1966 | Norwood |
| 4,325,849 A | 4/1982 | Rosen et al. |
| 4,543,399 A | 9/1985 | Jenkins, III et al. |
| 4,588,790 A | 5/1986 | Jenkins, III et al. |
| 4,613,484 A | 9/1986 | Ayres et al. |
| 4,701,432 A | 10/1987 | Welborn, Jr. |
| 4,935,397 A | 6/1990 | Chang |
| 4,937,301 A | 6/1990 | Chang |
| 5,026,795 A | 6/1991 | J. Hogan |
| 5,028,670 A | 7/1991 | Chinh et al. |
| 5,057,475 A | 10/1991 | Canich et al. |
| 5,064,802 A | 11/1991 | Stevens et al. |
| 5,096,867 A | 3/1992 | Canich |
| 5,132,380 A | 7/1992 | Stevens et al. |
| 5,317,036 A | 5/1994 | Brady, III et al. |
| 5,324,800 A | 6/1994 | Welborn, Jr. |
| 5,352,749 A | 10/1994 | DeChellis et al. |
| 5,405,922 A | 4/1995 | DeChellis et al. |
| 5,434,116 A | 7/1995 | Sone et al. |
| 5,436,304 A | 7/1995 | Griffin et al. |
| 5,453,471 A | 9/1995 | Bernier et al. |
| 5,462,999 A | 10/1995 | Griffin et al. |
| 5,554,775 A | 9/1996 | Krishnamurti et al. |
| 5,616,661 A | 4/1997 | Eisinger et al. |
| 5,633,394 A | 5/1997 | Welborn, Jr. |
| 5,637,659 A | 6/1997 | Krishnamurti et al. |
| 5,668,228 A | 9/1997 | Chinh et al. |
| 5,684,097 A | 11/1997 | Palmroos et al. |
| 5,703,187 A | 12/1997 | Timmers |
| 5,712,352 A | 1/1998 | Brant et al. |
| 5,763,543 A | 6/1998 | Muhle et al. |
| 6,002,033 A | 12/1999 | Razavi et al. |
| 6,008,662 A | 12/1999 | Newton et al. |
| 6,034,021 A | 3/2000 | Wilson et al. |
| 6,063,879 A | 5/2000 | Stephan et al. |
| 6,103,657 A | 8/2000 | Murray et al. |
| 6,114,479 A | 9/2000 | Speca et al. |
| 6,117,955 A | 9/2000 | Agapiou et al. |
| 6,124,230 A | 9/2000 | Speca et al. |
| 6,140,432 A | 10/2000 | Agapiou et al. |
| 6,180,729 B1 | 1/2001 | Lange et al. |
| 6,180,736 B1 | 1/2001 | Muhle et al. |
| 6,201,076 B1 | 3/2001 | Etherton et al. |
| 6,235,672 B1 | 5/2001 | McKay et al. |
| 6,271,325 B1 | 8/2001 | McConville |
| 6,274,684 B1 | 8/2001 | Loveday et al. |
| 6,277,931 B1 | 8/2001 | Jaber et al. |
| 6,300,438 B1 | 10/2001 | McConville |
| 6,300,439 B1 | 10/2001 | McConville |
| 6,303,719 B1 | 10/2001 | Murray et al. |
| 6,309,997 B1 | 10/2001 | Fujita et al. |
| 6,320,002 B1 | 11/2001 | Murray et al. |
| 6,342,463 B1 | 1/2002 | Stephan et al. |
| 6,372,864 B1 | 4/2002 | Brown |
| 6,399,535 B1 | 6/2002 | Shih et al. |

(Continued)

FOREIGN PATENT DOCUMENTS

| | | |
|---|---|---|
| EP | 630910 A1 | 12/1994 |
| EP | 811638 A2 | 12/1997 |
| JP | 2000-313717 A | 11/2000 |
| WO | 2004020486 A1 | 3/2004 |
| WO | WO 2009/023111 A1 | 2/2009 |

OTHER PUBLICATIONS

J. B. Peri and A. L. Hensley Jr., The Surface Structure of Solica Gel, J. Phys. Chem., 72 (8), 1968, p. 2926-2933.
S. Brunaver, Journal of the American Chemical Society, 1938, v 60, p. 309-319.
Catalyst, Supported, Kirk-Othmer Encyclopedia of Chemical Tech., piblished online Nov. 15, 2002, John Wiley & Sons.

*Primary Examiner* — Caixia Lu
(74) *Attorney, Agent, or Firm* — Kenneth H Johnson

(57) ABSTRACT

Olefin polymerization is carried out with a single site polymerization catalyst in the presence of a continuity additive. The continuity additive is a cocktail containing one or more dialkanolamide derived from a fatty acid, an oil soluble sulfonic acid and a dialkanolamine.

25 Claims, 5 Drawing Sheets

(56) References Cited

U.S. PATENT DOCUMENTS

| | | |
|---|---|---|
| 6,399,724 B1 | 6/2002 | Matsui et al. |
| 6,417,304 B1 | 7/2002 | McConville |
| 6,476,165 B1 | 11/2002 | Wang |
| 6,489,413 B1 | 12/2002 | Floyd et al. |
| 6,559,090 B1 | 5/2003 | Shih et al. |
| 6,562,924 B2 | 5/2003 | Benazouzz et al. |
| 6,583,083 B2 | 6/2003 | Murray et al. |
| 6,593,266 B1 | 7/2003 | Matsui et al. |
| 6,686,306 B2 | 2/2004 | Shih |
| 6,689,847 B2 | 2/2004 | Mawson et al. |
| 6,734,131 B2 | 5/2004 | Shih et al. |
| 6,734,266 B2 * | 5/2004 | Gao et al. .................. 526/129 |
| 6,770,723 B2 | 8/2004 | Fujita et al. |
| 6,777,509 B2 | 8/2004 | Brown |
| 6,825,293 B1 | 11/2004 | Goyal et al. |
| 6,891,002 B2 | 5/2005 | Abe et al. |
| 6,958,375 B2 | 10/2005 | Shih et al. |
| 6,977,283 B1 | 12/2005 | Shutt et al. |
| 6,984,695 B2 | 1/2006 | Brown |
| 7,205,363 B2 | 4/2007 | Dickey et al. |
| 7,476,715 B2 | 1/2009 | McKay et al. |
| 7,531,602 B2 | 5/2009 | Hoang et al. |
| 7,638,585 B2 | 12/2009 | Van Pelt et al. |
| 7,652,109 B2 | 1/2010 | Lemesle et al. |
| 2005/0148742 A1 | 7/2005 | Hagerty |
| 2009/0203859 A1 | 8/2009 | Xu et al. |

\* cited by examiner

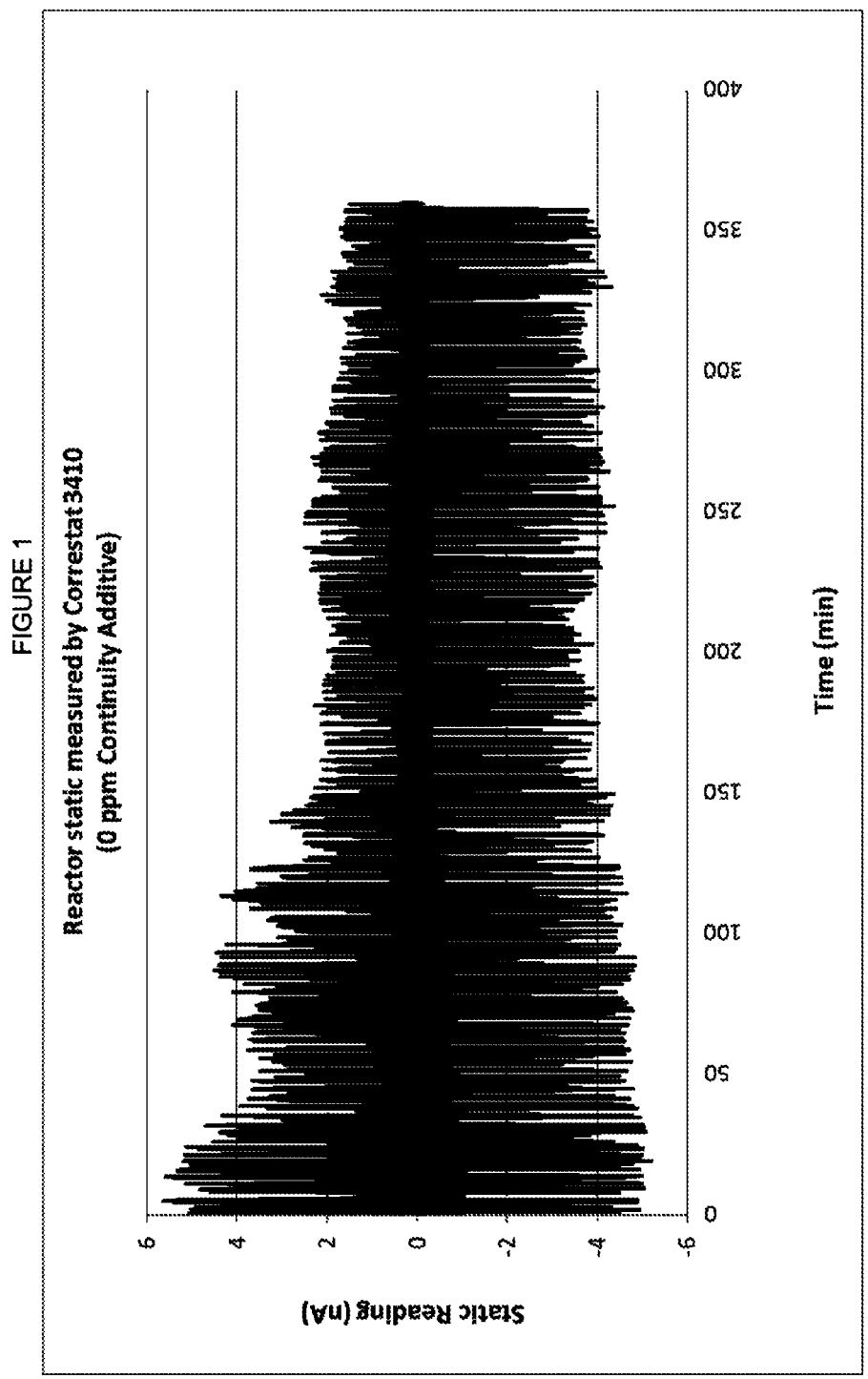

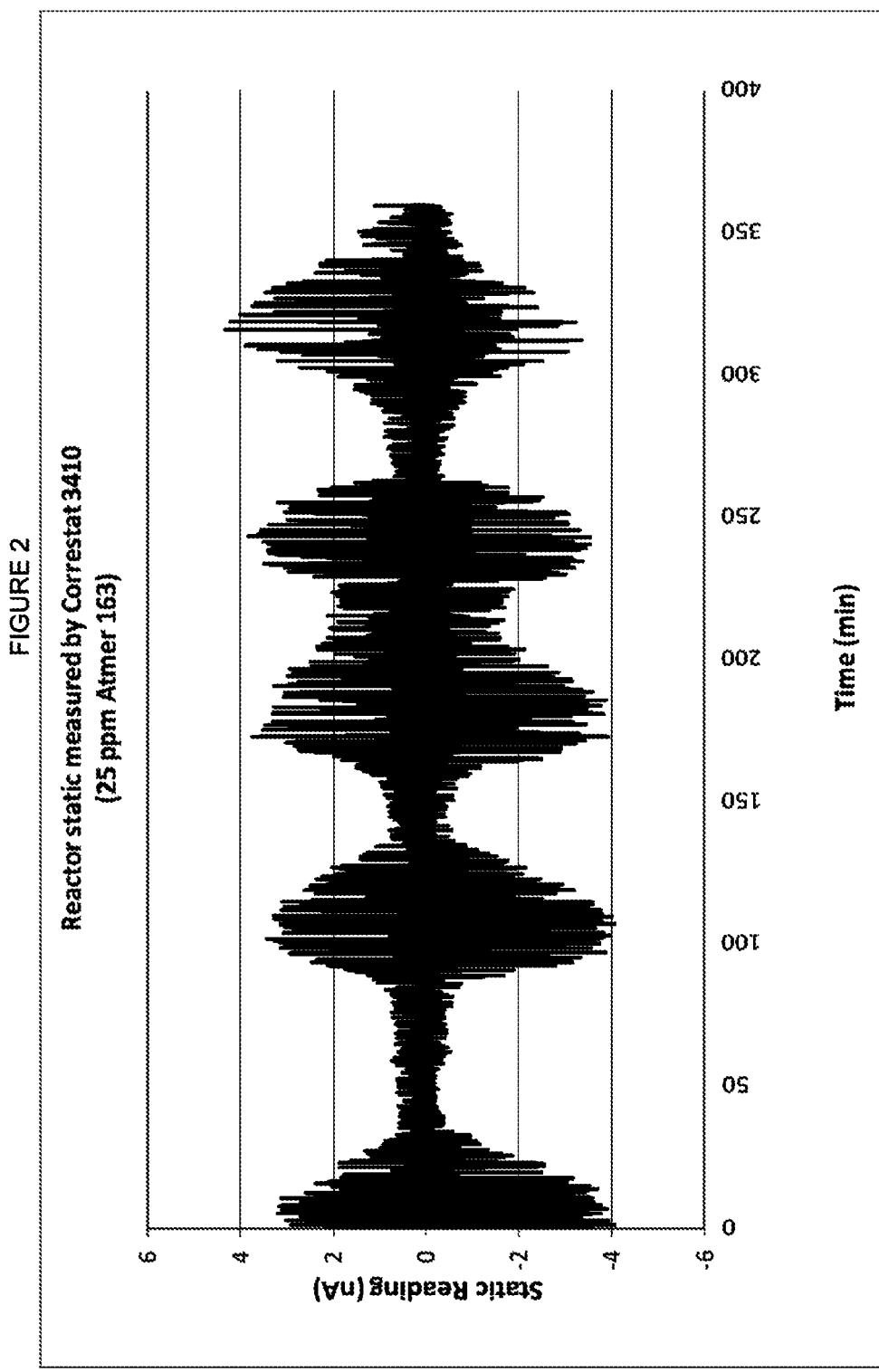

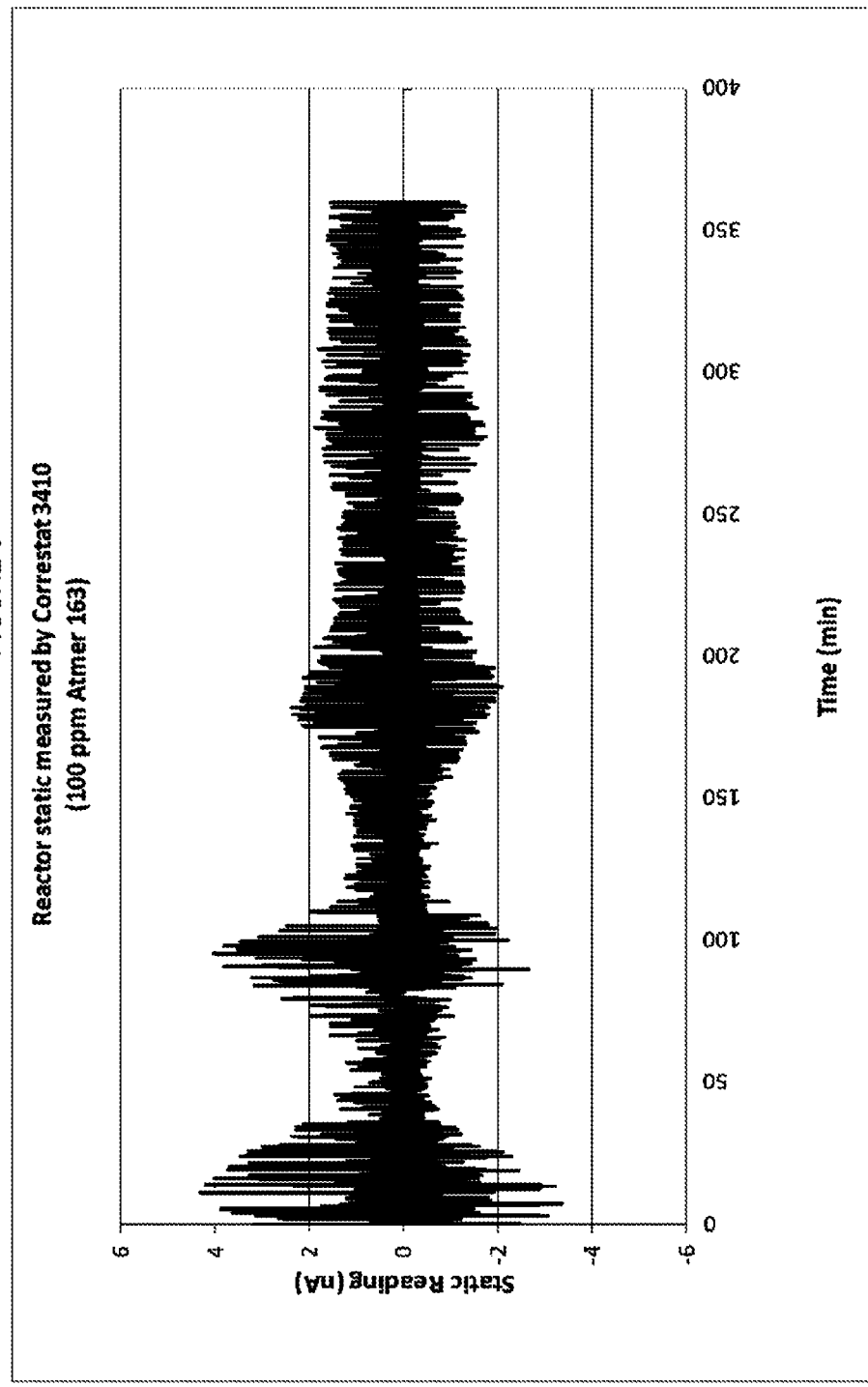

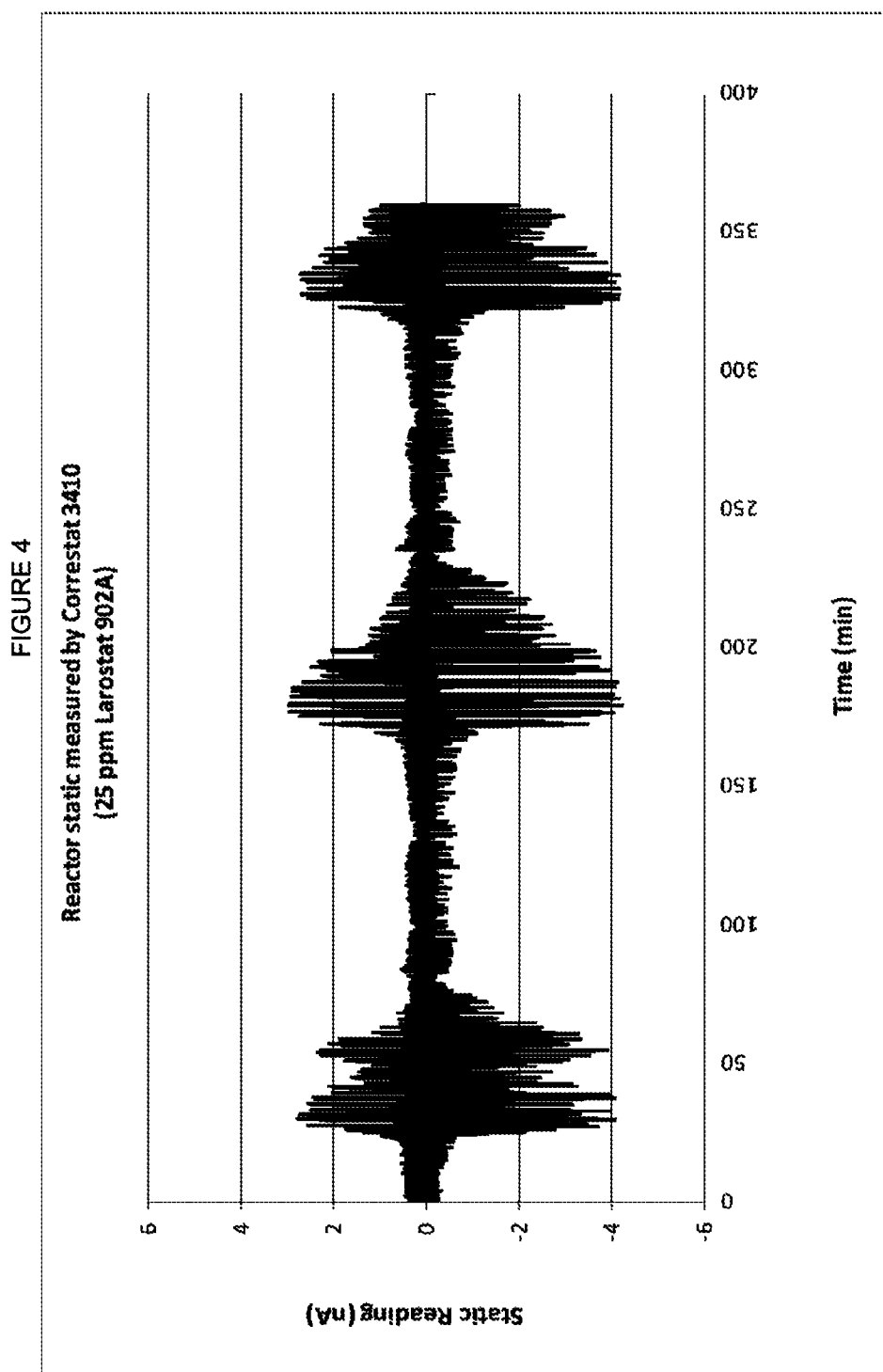

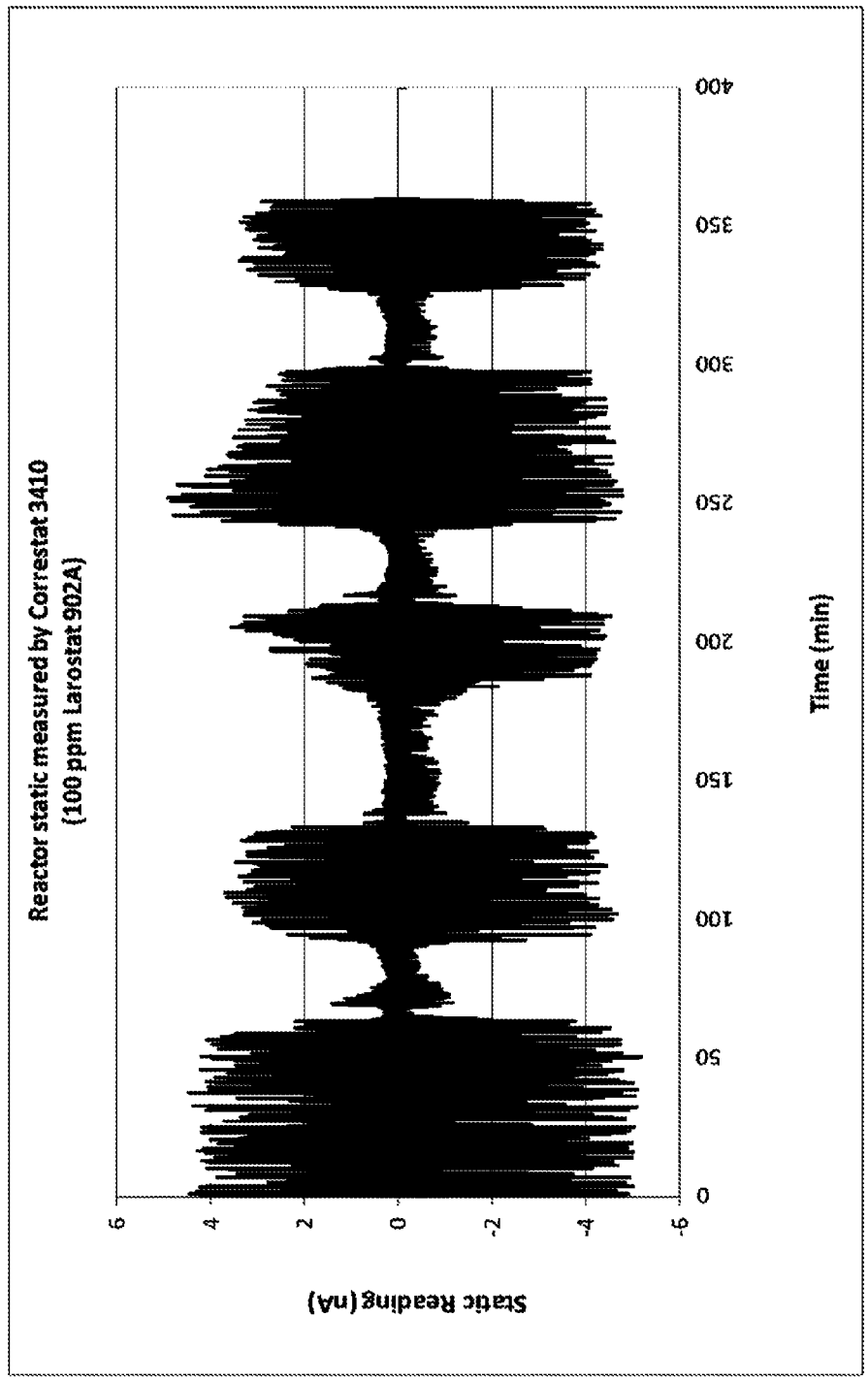

REACTOR OPERABILITY IN A GAS PHASE POLYMERIZATION PROCESS

FIELD OF THE INVENTION

The present invention relates to a polymerization processes having reduced associated fouling when carried out in the presence of a single site polymerization catalyst and a continuity additive. Specifically, polymerization is carried out in the presence of a continuity additive which is a cocktail comprising one or more fatty acid dialkanolamides, an oil soluble sulfonic acid, and a dialkanolamine.

BACKGROUND OF THE INVENTION

Gas phase olefin polymerization with single site catalysts has been a well established art field since the invention of metallocene catalysts over two decades ago. Although, single site catalysts (such as metallocene catalysts, constrained geometry catalysts, and phosphinimine catalysts) are often chosen for their very high activity, the use of such catalysts can lead to reactor fouling especially in a fluidized bed gas phase reactor. Such fouling may include polymer agglomeration, sheeting, or chunking and may ultimately require reactor shut down.

In order to improve reactor continuity, several specialized catalyst preparative methods, operating conditions and additives (e.g. so called "continuity additives") have been used to modify the performance of metallocenes (and other single site catalysts) and to reduce reactor fouling. For example, European Pat. Appl. No. 630,910 discusses reversibly reducing the activity of a metallocene catalyst using a Lewis base compound. Related methods employ long chain substituted alkanolamine and long chain substituted alkanolamide compounds to reduce the amount of reactor fouling in fluidized bed polymerizations processes. The use of substituted alkanolamines in combination with metallocene catalysts to improve reactor operability and reduce static levels is described in European Pat. No. 811,638 and U.S. Pat. Nos. 5,712,352; 6,201,076; 6,476,165; 6,180,729; 6,977,283; 6,114,479; 6,140,432; 6,124,230; 6,117,955; 5,763,543; and 6,180,736. The use of a substituted alkanolamide as a reactor continuity additive in metallocene catalyzed polymerization of olefins is described in Japanese Patent Abstract No. 2000-313717. Alkanolamines have been added to a metallocene catalyst prior to addition to a reaction zone (see U.S. Pat. Nos. 6,140,432; 6,124,230; 6,114,479) and they have been added directly to a reactor or other associated parts of a fluidized bed reactor processes such as the recycle stream loop (see European Pat. No. 811,638 and U.S. Pat. No. 6,180,729 respectively).

The literature also provides additive mixtures which provide enhanced reactor operability. Oil soluble sulfonic acid compounds, for example, are most often used in combination with a polysulfone copolymer and a polymeric amine to provide a mixture which is effective in reducing reactor static levels and reactor fouling (see U.S. Pat. Nos. 7,476,715; 6,562,924; 5,026,795, and 7,652,109). WO 2009/023111A1 teaches that treatment of an antistatic agent with an organometallic scavenger, prior to its entry into a polymerization zone, provides for high catalyst activity and reduced reactor fouling. U.S. Pat. No. 6,891,002 shows that using an aliphatic amide in combination with polyoxyalkylene glycol and a liquid hydrocarbon provides improved catalyst activity and low associated reactor fouling.

Despite these advances, there remains a need for new continuity additive packages which are economical, easy to use and provide the dual features: improved reactor operability and high catalyst activity.

We now report that a cocktail comprising fatty acid alkanolamides, an oil soluble sulfonic acid, and a dialkanolamine shows good ability to enhance reactor operability in the gas phase when used in combination with a single site polymerization catalyst. We note that the use of a related cocktail was disclosed in U.S. Pat. No. 7,638,585 in the context of improving the performance of Ziegler-Natta polymerization catalysts. The patent does not teach the use of single site catalysts. The continuity additives of the present invention also give higher catalyst activity at increased levels than a more traditional single component antistat, the substituted alkanolamine antistat compound, Atmer-163™.

SUMMARY OF THE INVENTION

The present invention is directed to the use of a continuity additive recipe for use in a gas phase polymerization reactor together with a single site polymerization catalyst. The continuity additive comprises an alkanolamide, preferably one or more dialkanolamide derived from a fatty acid, an oil soluble sulfonic acid, and a alkanolamine, preferably a dialkanolamine.

Provided is a process for polymerizing ethylene and optionally an alpha olefin in a reactor with at least one single site polymerization catalyst in the presence of a continuity additive, the continuity additive comprising: i) a fatty acid alkanolamide, ii) an oil soluble sulfonic acid, and iii) an alkanolamine.

Provided is a process for polymerizing ethylene and optionally an alpha olefin in a reactor with at least one single site polymerization catalyst in the presence of a continuity additive, the continuity additive comprising: i) a fatty acid dialkanolamide, ii) an oil soluble sulfonic acid, and iii) a dialkanolamine.

Provided is a process for polymerizing ethylene and optionally an alpha olefin in a reactor with at least one single site polymerization catalyst in the presence of a continuity additive, the continuity additive comprising: i) a fatty acid diethanolamide having the formula $R^1C(=O)N(CH_2CH_2OH)_2$ where $R^1$ is a hydrocarbyl group having from 5 to 30 carbon atoms, ii) a benzene sulfonic acid having the formula $R^3C_6H_4SO_3H$, where $R^3$ is a hydrocarbyl group having from 6 to 30 carbon atoms, and iii) a dialkanolamine having the formula $HN((CH_2)_xOH)_2$ where x is an integer of from 1 to 8.

Provided is a process for polymerizing ethylene and optionally an alpha olefin in a reactor with at least one single site polymerization catalyst in the presence of a continuity additive, the continuity additive comprising: i) a mixture of two or more different fatty acid diethanolamides, each diethanolamide present in the mixture having the formula $R^1C(=O)N(CH_2CH_2OH)_2$ where $R^1$ is a hydrocarbyl group having anywhere from 5 to 30 carbon atoms, ii) a benzene sulfonic acid having the formula $R^3C_6H_4SO_3H$, where $R^3$ is an hydrocarbyl group having from 6 to 30 carbon atoms, and iii) a dialkanolamine having the formula $HN((CH_2)_xOH)_2$ where x is an integer of from 1 to 8.

Provided is a process for polymerizing ethylene and optionally an alpha olefin in a reactor with at least one single site polymerization catalyst in the presence of a continuity additive, the continuity additive comprising: i) a mixture of two or more different fatty acid diethanolamides, each diethanolamide present in the mixture having the formula $R^1C$ (=O)N(CH$_2$CH$_2$OH)$_2$, where R$^1$ is a hydrocarbyl group having 5, 7, 9, 11, 13, 15, or 17 carbon atoms, ii) a benzene sulfonic acid having the formula R$^3$C$_6$H$_4$SO$_3$H, where R$^3$ is a hydrocarbyl group having 6 to 22 carbon atoms, and iii) a dialkanolamine having the formula HN((CH$_2$)$_x$OH)$_2$, where x is 2 or 3.

Provided is a process for polymerizing ethylene and optionally an alpha olefin in a reactor with at least one single site polymerization catalyst in the presence of a continuity additive, the continuity additive comprising: i) a fatty acid alkanolamide, ii) an oil soluble sulfonic acid, and iii) an alkanolamine and wherein the single site polymerization catalyst comprises a phosphinimine catalyst and a cocatalyst.

Provided is a process for polymerizing ethylene and optionally an alpha olefin in a reactor with at least one single site polymerization catalyst in the presence of a continuity additive, the continuity additive comprising: i) a fatty acid dialkanolamide, ii) an oil soluble sulfonic acid, and iii) a dialkanolamine and wherein the single site polymerization catalyst comprises a phosphinimine catalyst and a cocatalyst.

Provided is a process for polymerizing ethylene and optionally an alpha olefin in a reactor with at least one single site polymerization catalyst in the presence of a continuity additive, the continuity additive comprising: i) a fatty acid dialkanolamide, ii) an oil soluble sulfonic acid, and iii) a dialkanolamine and wherein the single site polymerization catalyst comprises: a) a phosphinimine catalyst having the formula: (L)(Pl)MX$_2$, where M is Ti, Zr or Hf; Pl is a phosphinimine ligand having the formula R$_3$P=N—, where R is independently selected from the group consisting of hydrogen, halogen, and C$_1$-C$_{20}$ hydrocarbyl; L is ligand selected from the group consisting of cyclopentadienyl, substituted cyclopentadienyl, indenyl, substituted indenyl, fluorenyl, and substituted fluorenyl; and X is an activatable ligand and b) a cocatalyst selected from the group consisting of ionic activators, alkylaluminoxanes and mixtures thereof.

In an embodiment of the invention, the single site polymerization catalyst is supported on an inert support.

In an embodiment of the invention, the polymerization process is a gas phase polymerization process.

The continuity additive of the current invention can be used at relatively high levels without having a large negative impact on the catalyst activity, relative to a more traditional continuity additive.

BRIEF DESCRIPTION OF THE DRAWINGS

FIG. 1 shows the reactor static in nanoamps (nA) over time, measured using a Correstat 3410 static probe located in the reactor during a polymerization run. The polymerization is carried out in the absence of a continuity additive.

FIG. 2 shows the reactor static in nanoamps (nA) over time, measured using a Correstat 3410 static probe located in the reactor during a polymerization run. The polymerization is carried out in the presence of 25 ppm Atmer-163 (based on the weight of the polymer produced).

FIG. 3 shows the reactor static in nanoamps (nA) over time, measured using a Correstat 3410 static probe located in the reactor during a polymerization run. The polymerization is carried out in the presence of 100 ppm Atmer-163 (based on the weight of the polymer produced).

FIG. 4 shows the reactor static in nanoamps (nA) over time, measured using a Correstat 3410 static probe located in the reactor during a polymerization run. The polymerization is carried out in the presence of 25 ppm Larostat 902A (based on the weight of the polymer produced).

FIG. 5 shows the reactor static in nanoamps (nA) over time, measured using a Correstat 3410 static probe located in the reactor during a polymerization run. The polymerization is carried out in the presence of 100 ppm Larostat 902A (based on the weight of the polymer produced).

DETAILED DESCRIPTION OF PREFERRED EMBODIMENTS

In the present invention, a "continuity additive" is a mixture of substances which, when present in appropriate amounts, can reduce, prevent or mitigate at least one of fouling, sheeting, and static level of a material in a gas phase polymerization reactor.

The Continuity Additive

In the present invention, carrying out a polymerization reaction with a single site polymerization catalyst in the presence of a continuity additive comprising a fatty acid alkanolamide preferably one or more dialkanolamide(s); an oil soluble sulfonic acid; and a alkanolamine preferably a dialkanolamine; allows for operation of a gas phase polymerization reactor with reduction of at least one of fouling, sheeting, temperature excursions, and static level.

In the present invention a "fatty acid" monoalkanolamide or dialkanolamide is a monoalkanolamide or dialkanolamide which is derived from a fatty acid. Both are examples of "alkanolamide" compounds. A fatty acid is a carboxylic acid with a long hydrocarbyl group tail which is either saturated or unsaturated, and which is typically un-branched. Fatty acids can have different hydrocarbyl group tail lengths, which can be categorized as short, medium, or long. Short-chain fatty acids (SCFA) are fatty acids with hydrocarbyl group tails of fewer than six carbons. Medium-chain fatty acids (MCFA) are fatty acids with hydrocarbyl group tails of 6-12 carbon atoms. Long-chain fatty acids (LCFA) are fatty acids with hydrocarbyl tails longer than 12 carbons. Very-Long-chain fatty acids (VLCFA) are fatty acids with hydrocarbyl group tails longer than 22 carbons.

Notwithstanding the above, with respect to the continuity additive components of the present invention, the terms "hydrocarbyl" or "hydrocarbyl group" includes branched or straight chain hydrocarbyl groups which may be fully saturated groups (i.e. have no double or triple bonding moieties) or which may be partially unsaturated (i.e. they may have one or more double or triple bonding moieties). The hydrocarbyl group may also contain unsaturation in the form of aromatic ring moieties. The hydrocarbyl group is often chosen so as to provide a non-polar or hydrophobic end to an otherwise polar species. Such hydrocarbyl groups are well known to persons skilled in the art and generally comprise one or more straight chain hydrocarbyl groups (i.e. an aliphatic group) having at least five carbons atoms (although shorter hydrocarbon chains are also contemplated by the present invention).

Without wishing to be bound by any single method, fatty acid monoalkanolamides or dialkanolamides can be derived from carboxylic acids (i.e. fatty acids), for example, by reaction of suitable monoalkanolamine or dialkanolamine compounds having a reactive N—H group with one or more suitably functionalized carboxylic acid compounds (e.g. compounds in which the carboxylic acid functional group has been converted to carbonyl chloride group by treatment with thionyl chloride).

In an embodiment of the present invention, a fatty acid alkanolamide is represented by the formula: R$^1$(C=O)N(R$^2$)$_x$((CH$_2$)$_n$OH)$_y$ where R$^1$ is a hydrocarbyl group having from 5 to 30 carbon atoms, R$^2$ is hydrogen or a hydrocarbyl group having from 1 to 30 carbon atoms, x is 1 or 0, y is 1 when x is 1, y is 2 when x is 0, each n is independently an integer from 1 to 30 when y is 2, and n is an integer from 1 to 30 when y is 1.

The term "oil soluble" sulfonic acid connotes any oil-soluble sulfonic acid known to persons skilled in the art and includes for example, alkylsulfonic acids and alkylarylsulfonic acids. An example of an alkylsulfonic acid is petroleum sulfonic acid which is formed by treatment of petroleum oils with sulfuric acid. Preferred sulfonic acids however, are alkylarylsulfonic acids such as alkylbenzenesulfonic acids and alkylnaphthylsulfonic acids, specific examples of which include dodecylbenzenesulfonic acid and dinonylnaphthylsulfonic acid respectively.

In the present invention, the term "alkanolamine" includes monoalkanolamines, dialkanolamines and trialkanolamines. Alkanolamines are tri-coordinate nitrogen compounds containing at least one alcohol substituted hydrocarbyl group (one in the case of a monoalkanolamine, two in the case of a dialkanolamine, and three in the case of a trialkanolamine). Such alcohol substituted groups can be branched or straight chain hydrocarbyl groups or substituted hydrocarbyl groups having one or more carbon atoms and at least one alcohol group. The other groups which may be attached to nitrogen in an alkanolamine compound are generally selected from hydrocarbyl groups having one or more carbon atoms and/or a hydrogen group (H).

In an embodiment of the invention, an alkanolamine is represented by the formula: $R^4{}_xN((CH_2)_nOH)_y$ where $R^4$ is independently a hydrogen or a hydrocarbyl group having from 1 to 30 carbon atoms, x is 1 or 2, y is 2 when x is 1, y is 1 when x is 2, and n is independently an integer from 1 to 30.

In an embodiment of the invention, the continuity additive comprises at least one each of: i) a fatty acid alkanolamide, ii) an oil soluble sulfonic acid, and iii) an alkanolamine.

In an embodiment of the invention, the continuity additive comprises at least one each of: i) a fatty acid dialkanolamide, ii) an oil soluble sulfonic acid, and iii) a dialkanolamine.

In an embodiment of the invention, the fatty acid alkanolamide component of the continuity additive is one or more alkanoamide(s) represented by the formula: $R^1(C=O)N(R^2)_x((CH_2)_nOH)_y$ where $R^1$ is a hydrocarbyl group having from 5 to 30 carbon atoms, $R^2$ is hydrogen or a hydrocarbyl group having from 1 to 30 carbon atoms, x is 1 or 0, y is 1 when x is 1, y is 2 when x is 0, each n is independently an integer from 1 to 30 when y is 2, and n is an integer from 1 to 30 when y is 1.

In an embodiment of the invention, the fatty acid dialkanolamide component of the continuity additive is one or more dialkanoamide(s) having the formula: $R^1(C=O)N((CH_2)_nOH)((CH_2)_mOH)$ where $R^1$ is a hydrocarbyl group having from 5 to 30 carbon atoms; and n and m are integers of from 1 to 8.

In an embodiment of the invention, the dialkanolamine component of the continuity additive is one or more dialkanolamine(s) having the formula: $HN((CH_2)_nOH)((CH_2)_mOH)$ where n and m are integers of from 1 to 8.

In an embodiment of the invention, the continuity additive comprises a mixture of fatty acid dialkanolamides derived from coco fatty acids, an oil soluble sulfonic acid, and a dialkanolamine.

In an embodiment of the invention, the fatty acid dialkanolamide component of the continuity additive comprises one or more compound(s) having the formula: $R^1(C=O)N(CH_2CH_2OH)_2$ where $R^1$ is a hydrocarbyl group having any from 5 to 30 carbons atoms.

In an embodiment of the invention, the fatty acid dialkanolamide component of the continuity additive comprises one or more compound(s) having the formula: $R^1(C=O)N(CH_2CH_2OH)_2$ where $R^1$ is a saturated hydrocarbyl group having any one of from 5 to 30 carbons atoms.

In an embodiment of the invention, the fatty acid dialkanolamide component of the continuity additive comprises one or more compound(s) having the formula: $R^1(C=O)N(CH_2CH_2OH)_2$ where $R^1$ is a straight chain, saturated hydrocarbyl group having any one of from 5 to 30 carbons atoms.

In an embodiment of the invention, the fatty acid dialkanolamide component of the continuity additive comprises one or more compound(s) having the formula: $R^1(C=O)N(CH_2CH_2OH)_2$ where $R^1$ is a straight chain, hydrocarbyl group having any one of from 5 to 17 carbons atoms.

In an embodiment of the invention, the fatty acid dialkanolamide component of the continuity additive is a mixture of dialkanolamide compounds derived from coco fatty acids and comprises compounds having the formula $R^1(C=O)N(CH_2CH_2OH)_2$ where $R^1$ is a hydrocarbyl group with 5, 7, 9, 11, 13, 15, or 17 carbon atoms, in varying amounts.

In an embodiment of the invention, the fatty acid dialkanolamide component of the continuity additive is a mixture of different fatty acid diethanolamides having the formula $R^1(C=O)N(CH_2CH_2OH)_2$ where $R^1$ is a hydrocarbyl group with 5, 7, 9, 11, 13, 15, or 17 and wherein diethanolamide compounds having hydrocarbyl groups with 5, 7, 9, 11, 13, 15 or 17 carbons atoms are represented at least once in the mixture.

In an embodiment of the invention, the fatty acid dialkanolamide component of the continuity additive comprises: $CH_3(CH_2)_4C(=O)N(CH_2CH_2OH)_2$, $CH_3(CH_2)_6C(=O)N(CH_2CH_2OH)_2$, $CH_3(CH_2)_8C(=O)N(CH_2CH_2OH)_2$, $CH_3(CH_2)_{10}C(=O)N(CH_2CH_2OH)_2$, $CH_3(CH_2)_{12}C(=O)N(CH_2CH_2OH)_2$, $CH_3(CH_2)_{14}C(=O)N(CH_2CH_2OH)_2$, and $CH_3(CH_2)_{16}C(=O)N(CH_2CH_2OH)_2$.

In an embodiment of the invention, the fatty acid dialkanolamide component of the continuity additive comprises: $CH_3(CH_2)_4C(=O)N(CH_2CH_2OH)_2$, $CH_3(CH_2)_6C(=O)N(CH_2CH_2OH)_2$, $CH_3(CH_2)_8C(=O)N(CH_2CH_2OH)_2$, $CH_3(CH_2)_{10}C(=O)N(CH_2CH_2OH)_2$, $CH_3(CH_2)_{12}C(=O)N(CH_2CH_2OH)_2$, $CH_3(CH_2)_{14}C(=O)N(CH_2CH_2OH)_2$, and $CH_3(CH_2)_{16}C(=O)N(CH_2CH_2OH)_2$ where $CH_3(CH_2)_{10}C(=O)N(CH_2CH_2OH)_2$ is the majority component present by weight percent.

Some specific examples of suitable fatty acid dialkanolamide compounds which can be present in the continuity additive include fatty acid diethanolamides such as hexanoic acid diethanolamide, octanoic acid diethanolamide, nonanoic acid diethanolamide, decanoic acid diethanolamide, undecanoic acid diethanolamide, lauric acid diethanolamide, tridecylic acid diethanolamide, myristic acid diethanolamide, pentadecylic acid diethanolamide, palmitic acid diethanolamide, heptadecanoic acid diethanolamide, steric acid diethanolamide, oleic acid diethanolamide and linoleic acid diethanolamide. Although fatty acid diethanolamides are preferred, other fatty acid alkanolamides may also be used in the present invention. These include for example fatty acid dimethanolamides, fatty acid monomethanolamides, fatty acid monoethanolamides, fatty acid monopropanolamides, and fatty acid dipropanolamides. In the present invention, the fatty acid dialkanolamides may be used alone or as combinations or mixtures of two or more different fatty acid dialkanolamides.

In an embodiment of the invention the oil soluble sulfonic acid component of the continuity additive is an hydrocarbyl substituted benzene sulfonic acid compound of the formula $R^3C_6H_4SO_3H$, where $R^3$ is a hydrocarbyl group having 6 to 30 atoms.

In an embodiment of the invention the sulfonic acid component of the continuity additive is dodecylbenzenesulfonic acid, $CH_3(CH_2)_{11}C_6H_4SO_3H$. In an embodiment of the invention the sulfonic acid component of the continuity additive is para-substituted dodecylbenzenesulfonic acid, $CH_3(CH_2)_{11}C_6H_4SO_3H$.

In an embodiment of the invention, the alkanolamine is a monoalkanolamine and/or a dialkanolamine compound represented by the formula: $R^4{}_xN((CH_2)_nOH)_y$ where $R^4$ is independently a hydrogen or a hydrocarbyl group having from 1 to 30 carbon atoms, x is 1 or 2, y is 2 when x is 1, y is 1 when x is 2, and n is independently an integer from 1 to 30.

In an embodiment of the invention, the alkanolamine is a dialkanolamine compound represented by the formula: $HN((CH_2)_nOH)_2$ where n is independently an integer from 1 to 30.

In an embodiment of the invention, the alkanolamine is a monoalkanolamine compound represented by has the formula: $R^4HN((CH_2)_nOH)$ where $R^4$ is a hydrocarbyl group having anywhere from 1 to 30 carbon atoms, and n is an integer from 1 to 20.

In an embodiment of the invention, the alkanolamine is a dialkanolamine compound which has the formula: $R^4N((CH_2)_nOH)((CH_2)_mOH)$ where $R^4$ is hydrogen or a hydrocarbyl group having anywhere from 1 to 30 carbon atoms, and n and m are integers from 1 to 20.

In an embodiment of the invention, the alkanolamine is a dialkanolamine compound which has the formula: $HN((CH_2)_nOH)((CH_2)_mOH)$ where n and m are integers from 1 to 20.

In an embodiment of the invention, a dialkanolamine compound has the formula $HN((CH_2)_xOH)_2$ where x is independently an integer of from 1 to 30. In an embodiment of the invention, the dialkanolamine compound has the formula $HN((CH_2)_xOH)_2$ where x is independently an integer of from 1 to 8. In an embodiment of the invention, the dialkanolamine compound has the formula $HN((CH_2)_xOH)_2$ where x is 2 or 3.

In an embodiment of the invention, a dialkanolamine component of the continuity additive has the formula: $HN(CH_2CH_2OH)_2$.

In an embodiment of the invention, the continuity additive comprises: i) at least one fatty acid alkanolamide represented by formula: $R^1(C=O)N(R^2)_x((CH_2)_nOH)_y$ where $R^1$ is a hydrocarbyl group having from 5 to 30 carbon atoms, $R^2$ is hydrogen or a hydrocarbyl group having from 1 to 30 carbon atoms, x is 1 or 0, y is 1 when x is 1, y is 2 when x is 0, each n is independently an integer from 1 to 30 when y is 2, and n is an integer from 1 to 30 when y is 1; ii) a benzene sulfonic acid having the formula $R^3C_6H_4SO_3H$, where $R^3$ is a hydrocarbyl group having from 5 to 30 carbon atoms, and iii) an alkanolamine is represented by the formula: $R^4{}_xN((CH_2)_nOH)_y$ where $R^4$ is independently a hydrogen or a hydrocarbyl group having from 1 to 30 carbon atoms, x is 1 or 2, y is 2 when x is 1, y is 1 when x is 2, and n is independently an integer from 1 to 30.

In an embodiment of the invention, the continuity additive comprises: i) at least one fatty acid diethanolamide having the formula $R^1C(=O)N(CH_2CH_2OH)_2$ where $R^1$ is a hydrocarbyl group having from 5 to 30 carbon atoms, ii) a benzene sulfonic acid having the formula $R^3C_6H_4SO_3H$, where $R^3$ is a hydrocarbyl group having from 6 to 30 carbon atoms, and iii) a dialkanolamine having the formula $HN((CH_2)_xOH)_2$ where x is independently an integer of from 1 to 8.

In an embodiment of the invention, the continuity additive comprises: i) a mixture of two or more different fatty acid diethanolamides, each diethanolamide present in the mixture having the formula $R^1C(=O)N(CH_2CH_2OH)_2$, where $R^1$ is a hydrocarbyl group having anywhere from 5 to 30 carbon atoms, ii) a benzene sulfonic acid having the formula $R^3C_6H_4SO_3H$, where $R^3$ is a hydrocarbyl group having from 6 to 30 carbon atoms, and iii) a dialkanolamine having the formula $HN((CH_2)_xOH)_2$ where x is independently an integer of from 1 to 8.

In an embodiment of the invention, the continuity additive comprises: i) a mixture comprising two or more different fatty acid diethanolamides, each diethanolamide present in the mixture having the formula $R^1C(=O)N(CH_2CH_2OH)_2$, where $R^1$ is a hydrocarbyl group having 5, 7, 9, 11, 13, 15, or 17 carbon atoms, ii) a benzene sulfonic acid having the formula $R^3C_6H_4SO_3H$, where $R^3$ is a hydrocarbyl group having 6 to 30 carbon atoms, and iii) a dialkanolamine having the formula $HN((CH_2)_xOH)_2$ where x is independently an integer from 1 to 8.

In an embodiment of the invention, the continuity additive comprises: i) a mixture comprising at least seven different fatty acid diethanolamides, each diethanolamide present in the mixture having the formula $R^1C(=O)N(CH_2CH_2OH)_2$, where $R^1$ is a hydrocarbyl group having 5, 7, 9, 11, 13, 15, or 17 carbon atoms, ii) a benzene sulfonic acid having the formula $R^3C_6H_4SO_3H$, where $R^3$ is a hydrocarbyl group having 6 to 30 carbon atoms, and iii) a dialkanolamine having the formula $HN((CH_2)_xOH)_2$ where x is independently an integer from 1 to 8.

In an embodiment of the invention, the continuity additive comprises: i) a mixture comprising two or more different fatty acid diethanolamides, each diethanolamide present in the mixture having the formula $R^1C(=O)N(CH_2CH_2OH)_2$, where $R^1$ is a hydrocarbyl group having 5, 7, 9, 11, 13, 15, or 17 carbon atoms and where a diethanolamide having an hydrocarbyl group $R^1$ with 11 carbons atoms is the majority species present in the mixture of diethanolamides by weight percent, ii) a benzene sulfonic acid having the formula $R^3C_6H_4SO_3H$, where $R^3$ is a hydrocarbyl group having 6 to 30 carbon atoms, and iii) a dialkanolamine having the formula $HN((CH_2)_xOH)_2$ where x is independently an integer from 1 to 8.

In an embodiment of the invention, the continuity additive comprises: i) a mixture comprising two or more fatty acid diethanolamides having the formula $R^1C(=O)N(CH_2CH_2OH)_2$ where $R^1$ is a hydrocarbyl group having 5, 7, 9, 11, 13, 15, or 17 carbon atoms, ii) a benzene sulfonic acid having the formula $R^3C_6H_4SO_3H$, where $R^3$ is a hydrocarbyl group having 6 to 22 carbon atoms, and iii) an dialkanolamine having the formula $HN((CH_2)_xOH)_2$, where x is 2 or 3.

In an embodiment of the invention, the benzene sulfonic acid and the dialkanolamine present in the continuity additive are present in a 1:1 molar ratio.

In an embodiment of the invention, the fatty acid diethanolamide component of the continuity additive comprises from 50-95 weight % of the continuity additive, and the benzene sulfonic acid and dialkanolamine components of the continuity additive taken together comprise from 5-50 weight % of the continuity additive.

In an embodiment of the invention, the fatty acid diethanolamide component of the continuity additive comprises from 60-95 weight % of the continuity additive, and the benzene sulfonic acid and dialkanolamine components of the continuity additive taken together comprise from 5-40 weight % of the continuity additive.

In an embodiment of the invention, the continuity additive comprises: i) a mixture comprising two or more fatty acid diethanolamides having the formula $R^1C(=O)N(CH_2CH_2OH)_2$ where $R^1$ is a hydrocarbyl group having 5 to 30 carbon atoms, ii) a benzene sulfonic acid having the formula $R^3C_6H_4SO_3H$, where $R^3$ is a hydrocarbyl group having 6 to 22 carbon atoms, and iii) an dialkanolamine having the formula $HN((CH_2)_xOH)_2$, where x is 2 or 3; where the benzene sulfonic acid and the dialkanolamine are present in a 1:1 molar ratio and where the mixture of fatty acid diethanolamides comprises from 50-95 weight % of the continuity additive and the benzene sulfonic acid and dialkanolamine together comprise from 5-50 weight % of the continuity additive.

Without wishing to be bound by theory, a dialkanolamine having the formula $HN((CH_2)_nOH)((CH_2)_mOH)$ where n and m are integers from 1-20, and an oil soluble sulfonic acid present in the continuity additive may react with one another to form a salt.

The present invention also contemplates the use of a polyoxyethylenealkylamine of the formula $HN((CH_2CH_2O)_nH)((CH_2CH_2O)_mH)$ in place of, or in addition to, an alkanolamine or dialkanolamine, where n and m are integers from 1-10 or higher (i.e. polymeric).

The present invention also contemplates the use of a polyoxyethylenealkylamide of the formula $H(C=O)N((CH_2CH_2O)_nH)((CH_2CH_2O)_mH)$, in place of, or in addition to, an alkanolamide or dialkanolamide, where n and m are integers from 1-10 or higher (i.e. polymeric).

It is within the scope of the invention to use monoalkanolamides (instead of or together with dialkanolamides) and monoalkanolamines (instead of or together with dialkanolamines) as components of the continuity additive.

The Polymerization Process

Processes which employ the continuity additive of the present invention, include gas phase and slurry phase polymerization processes, with gas phase processes being preferred.

Detailed descriptions of slurry polymerization processes are widely reported in the patent literature. For example, particle form polymerization, or a slurry process where the temperature is kept below the temperature at which the polymer goes into solution is described in U.S. Pat. No. 3,248,179. Slurry processes include those employing a loop reactor and those utilizing a single stirred reactor or a plurality of stirred reactors in series, parallel, or combinations thereof. Non-limiting examples of slurry processes include continuous loop or stirred tank processes. Further examples of slurry processes are described in U.S. Pat. No. 4,613,484.

Slurry processes are conducted in the presence of a hydrocarbon diluent such as an alkane (including isoalkanes), an aromatic or a cycloalkane. The diluent may also be the alpha olefin comonomer used in copolymerizations. Alkane diluents include propane, butanes, (i.e. normal butane and/or isobutane), pentanes, hexanes, heptanes and octanes. The monomers may be soluble in (or miscible with) the diluent, but the polymer is not (under polymerization conditions). The polymerization temperature is preferably from about 5° C. to about 200° C., most preferably less than about 120° C. typically from about 10° C. to 100° C. The reaction temperature is selected so that an ethylene copolymer is produced in the form of solid particles. The reaction pressure is influenced by the choice of diluent and reaction temperature. For example, pressures may range from 15 to 45 atmospheres (about 220 to 660 psi or about 1500 to about 4600 kPa) when isobutane is used as diluent (see, for example, U.S. Pat. No. 4,325,849) to approximately twice that (i.e. from 30 to 90 atmospheres—about 440 to 1300 psi or about 3000-9100 kPa) when propane is used (see U.S. Pat. No. 5,684,097). The pressure in a slurry process must be kept sufficiently high to keep at least part of the ethylene monomer in the liquid phase. The reaction typically takes place in a jacketed closed loop reactor having an internal stirrer (e.g. an impeller) and at least one settling leg. Catalyst, monomers and diluents are fed to the reactor as liquids or suspensions. The slurry circulates through the reactor and the jacket is used to control the temperature of the reactor. Through a series of let down valves the slurry enters a settling leg and then is let down in pressure to flash the diluent and unreacted monomers and recover the polymer generally in a cyclone. The diluent and unreacted monomers are recovered and recycled back to the reactor.

A gas phase process is commonly carried out in a fluidized bed reactor. Such gas phase processes are widely described in the literature (see for example U.S. Pat. Nos. 4,543,399; 4,588,790; 5,028,670; 5,317,036; 5,352,749; 5,405,922; 5,436,304; 5,453,471; 5,462,999; 5,616,661 and 5,668,228).

In general, a fluidized bed gas phase polymerization reactor employs a "bed" of polymer and catalyst which is fluidized by a flow of monomer and other optional components which are at least partially gaseous. Heat is generated by the enthalpy of polymerization of the monomer flowing through the bed. Un-reacted monomer and other optional gaseous components exit the fluidized bed and are contacted with a cooling system to remove this heat. The cooled gas stream, including monomer, and optional other components (such as condensable liquids), is then re-circulated through the polymerization zone, together with "make-up" monomer to replace that which was polymerized on the previous pass. Simultaneously, polymer product is withdrawn from the reactor. As will be appreciated by those skilled in the art, the "fluidized" nature of the polymerization bed helps to evenly distribute/mix the heat of reaction and thereby minimize the formation of localized temperature gradients.

The reactor pressure in a gas phase process may vary from about atmospheric to about 600 Psig. In a more specific embodiment, the pressure can range from about 100 psig (690 kPa) to about 500 psig (3448 kPa). In another more specific embodiment, the pressure can range from about 200 psig (1379 kPa) to about 400 psig (2759 kPa). In yet another more specific embodiment, the pressure can range from about 250 psig (1724 kPa) to about 350 psig (2414 kPa).

The reactor temperature in a gas phase process may vary according to the heat of polymerization as described above. In a specific embodiment, the reactor temperature can be from about 30° C. to about 130° C. In another specific embodiment, the reactor temperature can be from about 60° C. to about 120° C. In yet another specific embodiment, the reactor temperature can be from about 70° C. to about 110° C. In still yet another specific embodiment, the temperature of a gas phase process can be from about 70° C. to about 100° C.

The fluidized bed process described above is well adapted for the preparation of polyethylene and polyethylene copolymers. Hence, preferred monomers and comonomers include ethylene and $C_{3-12}$ alpha olefins which are unsubstituted or substituted by up to two $C_{1-6}$ alkyl radicals; $C_{8-12}$ vinyl aromatic olefins which are unsubstituted or substituted by up to two substituents selected from the group consisting of $C_{1-4}$ alkyl radicals; and $C_{4-12}$ straight chained or cyclic diolefins which are unsubstituted or substituted by a $C_{1-4}$ alkyl radical. Illustrative non-limiting examples of alpha-olefins that may be copolymerized with ethylene include one or more of propylene, 1-butene, 1-pentene, 4-methyl-1-pentene, 1-hexene, 1-octene, and 1-decene, styrene, alpha methyl styrene, p-t-butyl styrene, and the constrained-ring cyclic olefins such as cyclobutene, cyclopentene, dicyclopentadiene norbornene, alkyl-substituted norbornenes, alkenyl-substituted norbornenes and the like (e.g. 5-methylene-2-norbornene and 5-ethylidene-2-norbornene, bicyclo-(2,2,1)-hepta-2,5-diene).

In an embodiment, the invention is directed toward a polymerization process involving the polymerization of one or more of the monomer and optionally comonomer(s) including ethylene alone or in combination with one or more linear or branched comonomer(s) having from 3 to 30 carbon atoms, preferably 3-12 carbon atoms, more preferably 4 to 8 carbon atoms. The process is particularly well suited to the copolymerization reactions involving polymerization of ethylene in combination with one or more of the comonomers: propylene, 1-butene, 1-pentene, 4-methyl-1-pentene, 1-hexene, 1-octene, 1-decene, styrene and cyclic and polycyclic olefins such as cyclopentene, norbornene and cyclohexene or a combination thereof. Other comonomers for use with ethylene can include polar vinyl monomers, diolefins such as 1,3-butadiene, 1,4-pentadiene, 1,4-hexadiene, 1,5-hexadiene, norbornadiene, and other unsaturated monomers including acetylene and aldehyde monomers. Higher alpha-olefins and polyenes or macromers can also be used. Preferably the comonomer is an alpha-olefin having from 3 to 15 carbon atoms, preferably 4 to 12 carbon atoms and most preferably 4 to 10 carbon atoms.

In an embodiment of the present invention, ethylene is copolymerized with an alpha olefin having from 3-10 carbon atoms and ethylene makes up at least 75 weight percent (i.e. wt %) of the total olefin feed entering the reactor.

In an embodiment of the present invention, ethylene is copolymerized with an alpha olefin having from 3-10 carbon atoms and ethylene makes up at least 85 wt % of the total olefin feed entering the reactor.

In embodiments of the present invention, ethylene is copolymerized with propene, 1-butene, 1-hexene or 1-octene.

In an embodiment of the present invention, ethylene is copolymerized with 1-butene and ethylene makes up at least 75 weight % (i.e. wt %) of the total olefin feed entering the reactor.

In an embodiment of the present invention, ethylene is copolymerized with 1-hexene and ethylene makes up at least 75 wt % of the total olefin feed entering the reactor.

In an embodiment of the present invention, ethylene is copolymerized with 1-hexene and ethylene makes up at least 85 wt % of the total olefin feed entering the reactor.

The Single Site Polymerization Catalyst

The polymerization catalysts usefully employed in the present invention are single site catalysts. Suitable single site catalysts are metallocene catalysts, constrained geometry catalysts and phosphinimine catalysts all of which are polymerization active organometallic compounds well known to persons skilled in the relevant art. Some non-limiting examples of metallocene catalysts can be found in U.S. Pat. Nos. 4,808,561; 4,701,432; 4,937,301; 5,324,800; 5,633,394; 4,935,397; 6,002,033 and 6,489,413, which are incorporated herein by reference. Some non-limiting examples of constrained geometry catalysts can be found in U.S. Pat. Nos. 5,057,475; 5,096,867; 5,064,802; 5,132,380; 5,703,187 and 6,034,021, all of which are incorporated by reference herein in their entirety. Some non-limiting examples of phosphinimine catalysts can be found in U.S. Pat. Nos. 6,342,463; 6,235,672; 6,372,864; 6,984,695; 6,063,879; 6,777,509 and 6,277,931 all of which are incorporated by reference herein. Other single site catalysts known in the art may also be used in the process of the present invention (e.g. catalysts comprising phenoxyimine and similar closely related ligands such as those described in U.S. Pat. Nos. 6,309,997; 6,399,724; 6,770,723 and 6,593,266; and catalysts comprising bidentate or tridentate ligands having a group 15 atom such as those described in U.S. Pat. Nos. 6,274,684; 6,689,847; 6,583,083; 6,300,438; 6,417,304; 6,300,439; 6,271,325; 6,320,002; 6,303,719; and 6,103,657). Generally, a single site polymerization catalyst will comprise as components: a single site catalyst (i.e. the polymerization active organometallic compound), a co-catalyst (i.e. activator), and optionally an inert support.

Preferably, the single site catalyst is based on a group 3, 4 or 5 metal (where the numbers refer to columns in the Periodic Table of the Elements using IUPAC nomenclature). Most typically, single site catalysts are based on metals from group 4, which includes titanium, hafnium and zirconium. The most preferred single site catalysts are group 4 metal complexes in their highest oxidation state.

The single site catalysts described herein, usually require activation by one or more cocatalytic or activator species in order to provide polymer. Hence, single site catalysts are sometimes called "pre-catalysts".

Particularly suitable for use in the present invention are phosphinimine catalysts which are further described below.

A phosphinimine catalyst is an organometallic compound based on a group 3, 4 or 5 metal and which is characterized as having at least one phosphinimine ligand. Any organometallic compounds/complexes having a phosphinimine ligand and which display catalytic activity for ethylene (co)polymerization are contemplated for use in the current invention.

In an embodiment of the invention, a phosphinimine catalyst is defined by the formula: $(L)_n(Pl)_m MX_p$ where M is a transition metal selected from Ti, Hf, Zr; Pl is a phosphinimine ligand or a ketimine ligand; L is a cyclopentadienyl type ligand or a heteroatom ligand; X is an activatable ligand; m is 1 or 2; n is 0 or 1; and p is determined by the valency of the metal M. Preferably m is 1, n is 1 and p is 2.

In a preferred embodiment of the invention, a phosphinimine catalyst is defined by the formula: $(L)(Pl)MX_2$ where M is a transition metal selected from Ti, Hf, Zr; Pl is a phosphinimine ligand; L is a cyclopentadienyl type ligand; and X is an activatable ligand.

The phosphinimine ligand is defined by the formula: $R_3P=N-$ wherein each R is independently selected from the group consisting of a hydrogen atom; a halogen atom; $C_{1-20}$ hydrocarbyl radicals which are unsubstituted or further substituted by one or more halogen atom and/or $C_{1-20}$ alkyl radical; $C_{1-8}$ alkoxy radical; $C_{6-10}$ aryl or aryloxy radical; amido radical; silyl radical of the formula: $-SiR'_3$ wherein each R' is independently selected from the group consisting of hydrogen, a $C_{1-8}$ alkyl or alkoxy radical, $C_{6-10}$ aryl or aryloxy radicals; and germanyl radical of the formula: $-GeR'_3$ wherein R' is as defined above.

In an embodiment of the invention the phosphinimine ligand is chosen so that each R is a hydrocarbyl radical. In a particular embodiment of the invention, the phosphinimine ligand is tri-(tertiarybutyl)phosphinimine (i.e. where each R is a tertiary butyl group).

In an embodiment of the invention, the phosphinimine catalyst is a group 4 organometallic complex which contains one phosphinimine ligand (as described above) and one ligand L which is either a cyclopentadienyl-type ligand or a heteroatom ligand.

As used herein, the term cyclopentadienyl-type ligand is meant to convey its conventional meaning, namely a ligand having a five carbon ring which is bonded to the metal via eta-5 bonding. Thus, the term "cyclopentadienyl-type" includes unsubstituted cyclopentadienyl, singly or multiply substituted cyclopentadienyl, unsubstituted indenyl, singly or multiply substituted indenyl, unsubstituted fluorenyl and singly or multiply substituted fluorenyl. An exemplary list of substituents for a cyclopentadienyl, indenyl or fluorenyl ligand includes the group consisting of $C_{1-10}$ hydrocarbyl radical (which hydrocarbyl substituents are unsubstituted or further substituted by for example a halide and/or a hydrocarbyl group); a halogen atom; $C_{1-8}$ alkoxy radical; a $C_{1-10}$ aryl or aryloxy radical (each of which may be further substituted by for example a halide and/or a hydrocarbyl group); an amido radical which is unsubstituted or substituted by up to two $C_{1-8}$ alkyl radicals; a phosphido radical which is unsubstituted or substituted by up to two $C_{1-8}$ alkyl radicals; silyl radicals of the formula —Si(R')$_3$ wherein each R' is independently selected from the group consisting of hydrogen, a $C_{1-8}$ alkyl or alkoxy radical $C_{6-10}$ aryl or aryloxy radicals; and germanyl radicals of the formula —Ge(R')$_3$ wherein R' is as defined directly above.

As used herein, the term "heteroatom ligand" refers to a ligand which contains at least one heteroatom selected from the group consisting of boron, nitrogen, oxygen, phosphorus or sulfur. The heteroatom ligand may be sigma or pi-bonded to the metal. Exemplary heteroatom ligands include but are not limited to "silicon containing" ligands, "amido" ligands, "alkoxy" ligands, "boron heterocycle" ligands and "phosphole" ligands.

As used herein, the term "ketimine ligand" refers to a ligand which: (a) is bonded to the transition metal via a metal-nitrogen atom bond; (b) has a single substituent on the nitrogen atom, (where this single substituent is a carbon atom which is doubly bonded to the N atom); and (c) has two substituents, Sub 1 and Sub 2 which are bonded to the carbon atom. A ketimine ligand may have the formula (Sub1)(Sub2)C=N—. The substituents "Sub 1" and "Sub 2" may be the same or different. Exemplary substituents include hydrocarbyls having from 1 to 20 carbon atoms; silyl groups, amido groups and phosphido groups. The substituents, Sub 1 and Sub2 may together form a ring. The ring may have unsaturation in it. For reasons of cost and convenience these substituents may both be hydrocarbyls, especially simple alkyls such as for example tertiary butyl.

Silicon containing ligands are defined by the formula: -(μ)SiR$^x$R$^y$R$^z$ where the "—" denotes a bond to the transition metal and μ is sulfur or oxygen. The substituents on the Si atom, namely R$^x$, R$^y$ and R$^z$ are required in order to satisfy the bonding orbital of the Si atom. The use of any particular substituent R$^x$, R$^y$ or R$^z$ is not especially important. It an embodiment of the invention, each of R$^x$, R$^y$ and R$^z$ is a $C_{1-2}$ hydrocarbyl group (i.e. methyl or ethyl) simply because such materials are readily synthesized from commercially available materials.

The term "amido" is meant to convey its broad, conventional meaning. Thus, these ligands are characterized by (a) a metal-nitrogen bond and (b) the presence of two substituents (which are typically simple alkyl or silyl groups) on the nitrogen atom.

The term "alkoxy" is also intended to convey its conventional meaning. Thus these ligands are characterized by (a) a metal oxygen bond, and (b) the presence of a hydrocarbyl group bonded to the oxygen atom. The hydrocarbyl group may be a ring structure and may optionally be substituted (e.g. 2,6 di-tertiary butyl phenoxy).

The "boron heterocyclic" ligands are characterized by the presence of a boron atom in a closed ring ligand. This definition includes heterocyclic ligands which also contain a nitrogen atom in the ring. These ligands are well known to those skilled in the art of olefin polymerization and are fully described in the literature (see, for example, U.S. Pat. Nos. 5,637,659 and 5,554,775 and the references cited therein).

The term "phosphole" is also meant to convey its conventional meaning. "Phospholes" are cyclic dienyl structures having four carbon atoms and one phosphorus atom in the closed ring. The simplest phosphole is $C_4H_4$ (which is analogous to cyclopentadiene with one carbon in the ring being replaced by phosphorus). The phosphole ligands may be substituted with, for example, $C_{1-20}$ hydrocarbyl radicals (which may, optionally, contain halogen substituents); phosphido radicals; amido radicals; silyl or alkoxy radicals. Phosphole ligands are also well known to those skilled in the art of olefin polymerization and are described as such in U.S. Pat. No. 5,434,116.

The term "activatable ligand" refers to a ligand which may be activated by a cocatalyst (also referred to as an "activator"), to facilitate olefin polymerization. Examples of activatable ligands X are independently selected from the group consisting of a hydrogen atom; a halogen atom; a $C_{1-10}$ hydrocarbyl radical; a $C_{1-10}$ alkoxy radical; a $C_{5-10}$ aryl oxide radical, each of which said hydrocarbyl, alkoxy, and aryl oxide radicals may be unsubstituted by or further substituted by a halogen atom, a $C_{1-8}$ alkyl radical, a $C_{1-8}$ alkoxy radical, a $C_{6-10}$ aryl or aryloxy radical; an amido radical which is unsubstituted or substituted by up to two $C_{1-8}$ alkyl radicals; and a phosphido radical which is unsubstituted or substituted by up to two $C_{1-8}$ alkyl radicals. Two activatable X ligands may also be joined to one another and form for example, a substituted or unsubstituted diene ligand (i.e. 1,3-diene); or a delocalized heteroatom containing group such as an acetate or acetamidinate group.

The number of activatable ligands depends upon the valency of the metal and the valency of the activatable ligand. The preferred organometallic catalysts are based on group 4 metals in their highest oxidation state (i.e. 4$^+$). Suitable activatable ligands are monoanionic such as a halide (e.g. chloride) or a alkyl (e.g. methyl, benzyl).

In some instances, the metal of the single site catalyst may not be in the highest oxidation state. For example, a titanium (III) component would contain only one activatable ligand.

In an embodiment of the invention, the single site catalyst has the formula, (L)(Pl)MX$_2$, where M is Ti, Zr or Hf; Pl is a phosphinimine ligand having the formula R$_3$P=N—, where R is independently selected from the group consisting of hydrogen, halogen, and $C_1$-$C_{20}$ hydrocarbyl; L is ligand selected from the group consisting of cyclopentadienyl, substituted cyclopentadienyl, indenyl, substituted indenyl, fluorenyl, and substituted fluorenyl; and X is an activatable ligand.

In an embodiment of the invention, the single site catalyst contains a phosphinimine ligand, a substituted cyclopentadienyl ligand and two chloride or two methyl ligands bonded to the group 4 metal.

In an embodiment of the invention, the single site catalyst contains a phosphinimine ligand, a perfluoroaryl substituted cyclopentadienyl ligand and two chloride or two methyl ligands bonded to the group 4 metal.

In an embodiment of the invention, the single site catalyst contains a phosphinimine ligand, a perfluorphenyl substituted cyclopentadienyl ligand (i.e. Cp-$C_6F_5$) and two chloride or two methyl ligands bonded to the group 4 metal.

In an embodiment of the invention, the phosphinimine catalyst will have a 1,2-substituted cyclopentadienyl ligand and a phosphinimine ligand which is substituted by three tertiary butyl substituents.

In an embodiment of the invention, the phosphinimine catalyst will have a 1,2 substituted cyclopentadienyl ligand (e.g. a 1,2-(R")(Ar—F)Cp) where the substituents are selected from R" a hydrocarbyl group, and Ar—F a perfluorinated aryl group, a 2,6 (i.e. ortho) fluoro substituted phenyl group, or a 2,3,5,6 (i.e. ortho/meta) fluoro substituted phenyl group respectively.

In an embodiment of the invention, the phosphinimine catalyst has the formula: (1,2-(R")(Ar—F)Cp)Ti(N=P(t-Bu)$_3$)X$_2$ where R" is a hydrocarbyl group; Ar—F is a perfluorinated aryl group, a 2,6 (i.e. ortho) fluoro substituted phenyl group or a 2,3,5,6 (i.e. ortho/meta) fluoro substituted phenyl group; M is Ti, Zr or Hf; and X is an activatable ligand. In an embodiment of the invention, the phosphinimine catalyst has the formula: (1,2-(R")(Ar—F)Cp)Ti(N=P(t-Bu)$_3$)X$_2$ where R" is a hydrocarbyl group having from 1 to 20 carbons; Ar—F is a perfluorinated aryl group; M is Ti, Zr or Hf; and X is an activatable ligand. In an embodiment of the invention, the phosphinimine catalyst has the formula: (1,2-(n-R")(Ar—F)Cp)Ti(N=P(t-Bu)$_3$)X$_2$ where R" is a straight chain alkyl group; Ar—F is a perfluorinated aryl group; M is Ti, Zr or Hf; and X is an activatable ligand. In an embodiment of the invention, M is Ti and R" is selected from the group consisting of n-propyl, n-butyl and n-hexyl.

The term "perfluorinated aryl group" means that each hydrogen atom attached to a carbon atom in an aryl group has been replaced with a fluorine atom as is well understood in the art (e.g. a perfluorinated phenyl group or substituent has the formula —C$_6$F$_5$). In an embodiment of the invention, Ar—F is selected from the group comprising perfluorinated phenyl and perfluorinated naphthyl groups.

Some phosphinimine catalysts which may be used in the present invention include: ((C$_6$F$_5$)C$_P$)Ti(N=P(t-Bu)$_3$)Cl$_2$; (1,2-(n-propyl)(C$_6$F$_5$)Cp)Ti(N=P(t-Bu)$_3$)Cl$_2$, (1,2-(n-butyl)(C$_6$F$_5$)Cp)Ti(N=P(t-Bu)$_3$)Cl$_2$ and (1,2-(n-hexyl)(C$_6$F$_5$)Cp)Ti(N=P(t-Bu)$_3$)Cl$_2$.

Preferably, the single site catalyst of the current invention is used in combination with at least one activator (or "cocatalyst") to form an active polymerization catalyst system for olefin polymerization. Activators (i.e. cocatalysts) include ionic activator cocatalysts and alkylaluminoxane cocatalysts.

The activator may be one of or both of an i) an alkylaluminoxane and ii) an ionic activator, optionally together with an alkylating agent.

The alkylaluminoxanes are complex aluminum compounds of the formula: R'''$_2$Al$^1$O(R'''Al$^1$O)$_m$Al$^1$R'''$_2$ wherein each R''' is independently selected from the group consisting of C$_{1-20}$ hydrocarbyl radicals and m is from 3 to 50. Optionally a hindered phenol can be added to the alkylaluminoxane to provide a molar ratio of Al$^1$:hindered phenol of from 2:1 to 5:1 when the hindered phenol is present.

In an embodiment of the invention, R''' of the alkylaluminoxane, is a methyl radical and m is from 10 to 40. In an embodiment, the molar ratio of Al$^1$:hindered phenol, if it is present, is from 3.25:1 to 4.50:1. Preferably the phenol is substituted in the 2, 4 and 6 position by a C$_{2-6}$ alkyl radical. Desirably, the hindered phenol is 2,6-di-tertbutyl-4-ethylphenol.

The alkylaluminoxanes are typically used in substantial molar excess compared to the amount of group 4 transition metal in the single site catalyst complex (e.g. the phosphinimine catalyst). The Al$^1$:group 4 transition metal molar ratios are from 10:1 to 10,000:1, preferably about 30:1 to 500:1.

It is well known in the art, the alkylaluminoxane can serve dual rolls as both an alkylator and an activator. Hence, an alkylaluminoxane activator is often used in combination with activatable ligands such as halogens.

Alternatively, the activator of the present invention may be a combination of an alkylating agent (which may also serve as a scavenger) with an activator capable of ionizing the single site catalyst (i.e. an ionic activator). In this context, the activator can be chosen from one or more alkylaluminoxane and/or an ionic activator.

When present, the alkylating agent may be selected from the group consisting of (R*)$_p$MgX$^2$$_{2-p}$ wherein X$^2$ is a halide and each R* is independently selected from the group consisting of C$_{1-10}$ alkyl radicals and p is 1 or 2; R*Li wherein in R* is as defined above, (R*)$_q$ZnX$^2$$_{2-q}$ wherein R* is as defined above, X$^2$ is halogen and q is 1 or 2; (R*)$_s$Al$^2$X$^2$$_{3-s}$ wherein R* is as defined above, X$^2$ is halogen and s is an integer from 1 to 3. Preferably in the above compounds R* is a C$_{1-4}$ alkyl radical, and X$^2$ is chlorine. Commercially available compounds include triethyl aluminum (TEAL), diethyl aluminum chloride (DEAC), dibutyl magnesium ((Bu)$_2$Mg), and butyl ethyl magnesium (BuEtMg or BuMgEt).

The ionic activator may be selected from the group consisting of: (i) compounds of the formula [R$^5$]$^+$[B(R$^6$)$_4$]$^-$ wherein B is a boron atom, R$^5$ is a cyclic C$_{5-7}$ aromatic cation or a triphenyl methyl cation and each R$^6$ is independently selected from the group consisting of phenyl radicals which are unsubstituted or substituted with from 3 to 5 substituents selected from the group consisting of a fluorine atom, a C$_{1-4}$ alkyl or alkoxy radical which is unsubstituted or substituted by a fluorine atom; and a silyl radical of the formula —Si(R$^7$)$_3$; wherein each R$^7$ is independently selected from the group consisting of a hydrogen atom and a C$_{1-4}$ alkyl radical; and (ii) compounds of the formula [(R$^8$)$_t$ZH]$^+$[B(R$^6$)$_4$]$^-$ wherein B is a boron atom, H is a hydrogen atom, Z is a nitrogen atom or phosphorus atom, t is 2 or 3 and R$^8$ is selected from the group consisting of C$_{1-8}$ alkyl radicals, a phenyl radical which is unsubstituted or substituted by up to three C$_{1-4}$ alkyl radicals, or one R$^8$ taken together with the nitrogen atom may form an anilinium radical and R$^6$ is as defined above; and (iii) compounds of the formula B(R$^6$)$_3$ wherein R$^6$ is as defined above.

In the above compounds preferably R$^6$ is a pentafluorophenyl radical, and R$^5$ is a triphenylmethyl cation, Z is a nitrogen atom and R$^8$ is a C$_{1-4}$ alkyl radical or R$^8$ taken together with the nitrogen atom forms an anilinium radical which is substituted by two C$_{1-4}$ alkyl radicals.

Examples of compounds capable of ionizing the single site catalyst complex include the following compounds: triethylammonium tetra(phenyl)boron, tripropylammonium tetra(phenyl)boron, tri(n-butyl)ammonium tetra(phenyl)boron, trimethylammonium tetra(p-tolyl)boron, trimethylammonium tetra(o-tolyl)boron, tributylammonium tetra(pentafluorophenyl)boron, tripropylammonium tetra(o,p-dimethylphenyl)boron, tributylammonium tetra(m,m-dimethylphenyl) boron, tributylammonium tetra(p-trifluoromethylphenyl) boron, tributylammonium tetra(pentafluorophenyl)boron, tri (n-butyl)ammonium tetra(o-tolyl)boron, N,N-dimethylanilinium tetra(phenyl)boron, N,N-diethylanilinium tetra(phenyl)boron, N,N-diethylanilinium tetra(phenyl)n-butylboron, N,N-2,4,6-pentamethylanilinium tetra(phenyl)boron, di-(isopropyl)ammonium tetra(pentafluorophenyl)boron, dicyclohexylammonium tetra(phenyl) boron, triphenylphosphonium tetra)phenyl)boron, tri(methylphenyl)phosphonium tetra(phenyl)boron, tri (dimethylphenyl)phosphonium tetra(phenyl)boron, tropillium tetrakispentafluorophenyl borate, triphenylmethylium tetrakispentafluorophenyl borate, benzene (diazonium) tetrakispentafluorophenyl borate, tropillium phenyltris-pentafluorophenyl borate, triphenylmethylium phenyltrispentafluorophenyl borate, benzene (diazonium) phenyltrispentafluorophenyl borate, tropillium tetrakis(2,3,5, 6-tetrafluorophenyl)borate, triphenylmethylium tetrakis(2,3, 5,6-tetrafluorophenyl)borate, benzene (diazonium)tetrakis (3,4,5-trifluorophenyl)borate, tropillium tetrakis(3,4,5-trifluorophenyl)borate, benzene (diazonium)tetrakis(3,4,5-trifluorophenyl)borate, tropillium tetrakis(1,2,2-trifluoroethenyl)borate, trophenylmethylium tetrakis(1,2,2- trifluoroethenyl)borate, benzene (diazonium)tetrakis(1,2,2-trifluoroethenyl)borate, tropillium tetrakis(2,3,4,5-tetrafluorophenyl)borate, triphenylmethylium tetrakis(2,3,4,5-tetrafluorophenyl)borate, and benzene (diazonium)tetrakis(2,3,4,5-tetrafluorophenyl)borate.

Commercially available activators which are capable of ionizing the single site catalyst complex include: N,N-dimethylaniliniumtetrakispentafluorophenyl borate ("[Me$_2$NHPh][B(C$_6$F$_5$)$_4$]"); triphenylmethylium tetrakispentafluorophenyl borate ("[Ph$_3$C][B(C$_6$F$_5$)$_4$]"); and trispentafluorophenyl boron.

The ionic activators compounds may be used in amounts which provide a molar ratio of group 4 transition metal (i.e. of the single site catalyst) to boron that will be from 1:1 to 1:6, preferably from 1:1 to 1:2.

Optionally, mixtures of alkylaluminoxanes and ionic activators can be used as activators for the single site catalyst complex (e.g. the phosphinimine catalyst).

In the present invention, the single site polymerization catalyst is preferably supported.

The support used in the present invention can be any support known in the art to be suitable for use with polymerization catalysts. For example the support can be any porous or non porous support material, such as talc, inorganic oxides, inorganic chlorides, aluminophosphates (i.e. AlPO$_4$) and polymer supports (e.g. polystyrene, etc). Hence, supports include Group 2, 3, 4, 5, 13 and 14 metal oxides generally, such as silica, alumina, silica-alumina, magnesium oxide, magnesium chloride, zirconia, titania, clay (e.g. montmorillonite) and mixtures thereof.

Agglomerate supports such as agglomerates of silica and clay may also be used as a support in the current invention.

Supports are generally used in calcined form. An inorganic oxide support, for example, will contain acidic surface hydroxyl groups which will react with a polymerization catalyst. Prior to use, the inorganic oxide may be dehydrated to remove water and to reduce the concentration of surface hydroxyl groups. Calcination or dehydration of a support is well known in the art. In embodiments of the invention, the support is calcined at temperatures above 200° C., or above 300° C., or above, 400° C., or above 500° C. In other embodiments, the support is calcined at from about 500° C. to about 1000° C., or from about 600° C. to about 900° C. The resulting support may be free of adsorbed water and may have a surface hydroxyl content from about 0.1 to 5 mmol/g of support, or from 0.5 to 3 mmol/g. The amount of hydroxyl groups in a silica support may be determined according to the method disclosed by J. B. Peri and A. L. Hensley Jr., in *J. Phys. Chem.*, 72 (8), 1968, pg 2926.

The support material, especially an inorganic oxide, typically has a surface area of from about 10 to about 700 m$^2$/g, a pore volume in the range from about 0.1 to about 4.0 cc/g and an average particle size of from about 5 to about 500 μm. In a more specific embodiment, the support material has a surface a surface area of from about 50 to about 500 m$^2$/g, a pore volume in the range from about 0.5 to about 3.5 cc/g and an average particle size of from about 10 to about 200 μm. In another more specific embodiment the support material has a surface a surface area of from about 100 to about 400 m$^2$/g, a pore volume in the range from about 0.8 to about 3.0 cc/g and an average particle size of from about 5 to about 100 μm.

The support material, especially an inorganic oxide, typically has an average pore size (i.e. pore diameter) of from about 10 to about 1000 Angstroms (Å). In a more specific embodiment, the support material has an average pore size of from about 50 to about 500 Å. In another more specific embodiment, the support material has an average pore size of from about 75 to about 350 Å.

The surface area and pore volume of a support may be determined by nitrogen adsorption according to B.E.T. techniques, which are well known in the art and are described in the *Journal of the American Chemical Society*, 1938, v 60, pg 309-319.

A silica support which is suitable for use in the present invention has a high surface area and is amorphous. By way of example, useful silicas are commercially available under the trademark of Sylopol® 958, 955 and 2408 by the Davison Catalysts, a Division of W. R. Grace and Company and ES-70W by PQ Corporation.

Agglomerate supports comprising a clay mineral and an inorganic oxide, may be prepared using a number techniques well known in the art including pelletizing, extrusion, drying or precipitation, spray-drying, shaping into beads in a rotating coating drum, and the like. A nodulization technique may also be used. Methods to make agglomerate supports comprising a clay mineral and an inorganic oxide include spray-drying a slurry of a clay mineral and an inorganic oxide. Methods to make agglomerate supports comprising a clay mineral and an inorganic oxide are disclosed in U.S. Pat. Nos. 6,686,306; 6,399,535; 6,734,131; 6,559,090 and 6,958,375.

An agglomerate of clay and inorganic oxide which is useful in the current invention may have the following properties: a surface area of from about 20 to about 800 m$^2$/g, preferably from 50 to about 600 m$^2$/g; particles with a bulk density of from about 0.15 to about 1 g/ml, preferably from about 0.20 to about 0.75 g/ml; an average pore diameter of from about 30 to about 300 Angstroms (Å), preferably from about 60 to about 150 Å; a total pore volume of from about 0.10 to about 2.0 cc/g, preferably from about 0.5 to about 1.8 cc/g; and an average particle size of from about 4 to 250 microns (μm), preferably from about 8 to 100 microns.

Optionally, a support, for example a silica support, may be treated with one or more salts of the type: Zr(SO$_4$)$_2$.4H$_2$O, ZrO(NO$_3$)$_2$, and Fe(NO$_3$)$_3$ as taught in co-pending U.S. Pat. No. 2,716,772. Supports that have been otherwise chemically treated are also contemplated for use with the catalysts and processes of the present invention.

Without wishing to be bound by theory, Zr(SO$_4$)$_2$.4H$_2$O and ZrO(NO$_3$)$_2$ may each act as a source of zirconium oxide (i.e. ZrO$_2$) which may form for example after calcinations temperatures are employed. Alternately, the Zr(SO$_4$)$_2$.4H$_2$O can be used to add Zr(SO$_4$)$_2$ to an inert support if very high calcinations temperatures (those which promote formation of zirconium oxide) are not employed.

The present invention is not limited to any particular procedure for supporting the polymerization catalyst components. Processes for depositing a single site catalyst complex (i.e. the polymerization active organometallic compound) as well as an activator on a support are well known in the art (for some non-limiting examples of catalyst supporting methods, see "Supported Catalysts" by James H. Clark and Duncan J. Macquarrie, published online Nov. 15, 2002 in the Kirk-Othmer Encyclopedia of Chemical Technology Copyright© 2001 by John Wiley & Sons, Inc.; for some non-limiting methods to support a single site catalyst see U.S. Pat. No. 5,965,677. For example, a single site catalyst (i.e. the organometallic compound) may be added by co-precipitation with the support material. The activator can be added to the support before and/or after the organometallic compound or together with the organometallic compound. Optionally, the activator can be added to a supported organometallic compound in situ or the organometallic compound may be added to the support in situ or the organometallic compound can be added to a supported activator in situ. The single site catalyst complex may be slurried or dissolved in a suitable diluent or solvent and then added to the support. Suitable solvents or diluents include but are not limited to hydrocarbons and mineral oil. The organometallic compound (i.e. the single site catalyst component) may be added to the solid support, in the form of a solid, solution or slurry, followed by the addition of the activator in solid form or as a solution or slurry. Single site catalyst, activator, and support can be mixed together in the presence or absence of a solvent.

The single site polymerization catalyst may be fed to a reactor system in a number of ways. If the polymerization catalyst is a supported catalyst on a suitable support, the catalyst may be fed to a reactor in dry mode using a dry catalyst feeder, examples of which are well known in the art. Alternatively, a supported catalyst may be fed to a reactor as a slurry in a suitable diluent. If the polymerization catalyst is unsupported, the catalyst can be fed to a reactor as a solution or as a slurry in a suitable solvent or diluents respectively. Polymerization catalyst components, which include a single site catalyst complex, a cocatalyst, and optionally a scavenger, a continuity additive, and an inert support, may be combined prior to their addition to a polymerization zone, or they may be combined on route to a polymerization zone.

Addition of a Continuity Additive

The continuity additive used in the present invention is as defined above in the "The Continuity Additive" section.

The continuity additive may be added to a polymerization reactor in a number of ways. The continuity additive may be added to a reactor system separately from the polymerization catalyst or it may be combined with the polymerization catalyst prior to feeding the combination to a reactor system. In the latter case, the continuity additive may be thought of as a polymerization catalyst modifier and works best for those single site polymerization catalysts that are not severely affected (i.e. poisoned) by the continuity additive. The continuity additive may also be dry blended with a supported polymerization catalyst prior to feeding it to a polymerization reactor as a slurry or dry feed. Alternatively the continuity additive may be added to an inert support and dry blended with a supported polymerization catalyst prior to entry into a polymerization zone.

The continuity additive may be fed to a reactor system using any appropriate method known to persons skilled in the art. For example, the continuity additive may be fed to a reactor system as a solution or as a slurry in a suitable solvent or diluent respectively. Suitable solvents or diluents are inert hydrocarbons well known to persons skilled in the art and generally include aromatics, paraffins, and cycloparaffinics such as for example benzene, toluene, xylene, cyclohexane, fuel oil, isobutane, mineral oil, kerosene and the like. Further specific examples include but are not limited to hexane, heptanes, isopentane and mixtures thereof. Alternatively, the continuity additive may be added to an inert support material and then fed to a polymerization reactor as a dry feed or a slurry feed. The continuity additive may be fed to various locations in a reactor system. When considering a fluidized bed process for example, the continuity additive may be fed directly to any area of the reaction zone, or any area of the entrainment zone, or it may be fed to any area within the recycle loop, where such areas are found to be effective sites at which to feed a continuity additive. For further various ways and locations of feeding a continuity additive see European Pat. Appl. 811,638, WO 2009/023111A1, and U.S. Pat. Appl. 2005/0148742A1 which are incorporated herein in their entirety by reference.

When added as a solution or mixture with a solvent or diluent respectively, the continuity additive may make up for example from 0.1 to 30 weight percent (i.e. wt %) of the solution or mixture, or from 0.1 to 20 wt %, or from 0.1 to 10 wt %, or from 0.1 to 5 wt % or from 0.1 to 2.5 wt % or from 0.2 to 2.0 wt %, although a person skilled in the art will recognize that further, possibly broader ranges, may also be used and so the invention should not be limited in this regard.

The continuity additive can be added to a reactor with all or a portion of one or more of the monomers or the recycle gas.

The continuity additive can be added through a dedicated feed line or added to any convenient feed stream including an ethylene feed stream, a comonomer feed stream, a catalyst feed line or a recycle line.

The continuity additive can be fed to a location in a fluidized bed system in a continuous or intermittent manner.

The continuity additive can be added to a reactor at a time before, after or during the start of the polymerization reaction The continuity additive may be added to a single site polymerization catalyst or to one or more single site polymerization catalyst components (i.e. the single site catalyst complex, the activator or the optional inert support) on route to a reaction zone.

In an embodiment of the invention, the continuity additive is added directly to a reaction zone, separately from a single site polymerization catalyst. Most typically it is so added by spraying a solution or mixture of the continuity additive directly into a reaction zone.

In an embodiment of the invention, the continuity additive is combined with a single site polymerization catalyst before adding the combination directly to a reaction zone.

In an embodiment of the invention, the continuity additive is added to a polymer seed bed present in a reactor prior to starting the polymerization reaction by introduction of a catalyst.

If the continuity additive is added to a single site polymerization catalyst prior to adding the polymerization catalyst to a reactor, then it can be added at any point during the preparation of the polymerization catalyst. Thus, at least one single site polymerization catalyst complex, at least one activator, at least one carrier and at least one continuity additive may be combined in any order to form a supported catalyst suitable for use in the present invention. Alternatively, at least one single site polymerization catalyst complex, at least one activator, and at one least continuity additive may be combined in any order to form an unsupported (e.g. solution or slurry form) catalyst suitable for use in the present invention.

In an embodiment of the invention, the continuity additive is added directly to a reaction zone, separately from a polymerization catalyst, and the continuity additive is added as a mixture with an inert hydrocarbon.

In an embodiment of the invention, the continuity additive is added directly to a reaction zone, separately from a polymerization catalyst, and the continuity additive is added as a mixture with an inert hydrocarbon, and is added during a polymerization reaction.

The continuity additive can in an embodiment of the invention, can be added both directly to a reactor and combined with a single site polymerization catalyst prior to the combination entering the reactor.

The total amount of continuity additive required in the present invention is not specifically limited, but it should be sufficient to prevent, mitigate or reduce the occurrence of a fouling event while not significantly reducing the catalyst activity, at least not to an activity which is below that which would be commercially acceptable. In this regard, the total level of continuity additive in the reactor will generally not exceed about 300 ppm, or 250 ppm, or 200 ppm, or 150 ppm, or 100 pm, or 50 pm (parts per million based on the weight of the polymer being produced).

In embodiments of the invention, the continuity additive will be present in a reactor at from 250 to 1 ppm, or from 200 to 1 ppm, or from 150 to 1 ppm, or from 200 to 5 ppm, or from 150 to 5 ppm, or from 100 to 1 ppm, or from 100 to 5 ppm, or from 250 ppm to 0.1 ppm, or from 200 ppm to 0.1 ppm, or from 150 ppm to 0.1 ppm, or from 100 ppm to 0.1 ppm, or from 50 ppm to 0.1 ppm, or from 50 ppm to 1 ppm (parts per million by weight of the polymer being produced).

In an embodiment of the invention, the effectiveness of the continuity additive may be conveniently monitored with one or more static probes. Static probes are designed to register static activity above or below zero. In a gas phase polymerization run, a fouling event is sometimes preceded by large non-zero measurements of static. In embodiments of the present invention, use of a continuity additive can restore or maintain a static activity level to or at a preferred magnitude respectively.

In an embodiment of the invention, the rate of addition of a continuity additive to a reactor will be adjusted to offset static charge developed in a polymerization reactor.

In an embodiment of the invention, the rate of addition of a continuity additive to a reactor will be programmed using measured reactor static levels as programming inputs, so as to maintain a constant or pre-determined level of static in a polymerization reactor.

Determination of the optimal amount of continuity additive may be evidenced by the value of the static activity measured in one or more locations in a gas fluidized bed polymerization system. For example, one or more static probes can be used to measure the level of static anywhere in the reactor proper (including upper, lower or intermediate bed probes), at a location within the entrainment zone, at a location within the recycle stream, at the distributer plate, at the annular disk which provides access to the flowing stream of gas entering the reactor, and the like as discussed in U.S. Pat. Appl. No. 2005/0148742A1, which is incorporated herein by reference. Hence, the static probes themselves may be designated as at least one recycle line probe, at least one annular disk probe, at least one distributer plate probe, at least one upper reactor static probe, an annular disk probe or a conventional probe which is located within the fluidized bed.

In a conventional reactor wall static probe, the probe measures the electric current that flows from a probe tip and which results from particle impact therewith. The particles could be resin particles or catalyst particles for example. The probe measures current per unit of area on the probe tip which serves as an estimate of the charge transfer occurring on the reactor wall. In this scenario, the probe tip is meant to simulate a small portion of the reactor wall. The probe tip may be made of any suitable conducting materials such as carbon steel, iron, stainless steel, titanium, platinum, nickel, Monel®, copper, aluminum and the like as further described in U.S. Pat. No. 6,008,662 which is incorporated herein by reference.

More generally, static probes include a metallic probe tip, one or more signal wires, and an electric feed to a measuring instrument as discussed in U.S. Pat. Appl. 2005/0148742 A1. Any instrument or device capable of measuring current flow from the probe tip to ground can be used. These include for example an ammeter, a picoammeter, a multi-meter, or electrometer. The current may also be measured in an indirect way by instead determining the voltage generated by the current when it is passed though an in-series resistor. The current can be determined from voltage using Ohm's law as further described in U.S. Pat. No. 6,008,662 which is incorporated herein by reference.

Typical current levels measured with a conventional reactor wall static probe range from ±0.1 to 10 nanoamps/cm$^2$, or smaller ranges within this range (e.g. ±0.1 to 8 nanoamps/cm$^2$, ±0.1 to 6 nanoamps/cm$^2$ and the like). The measurements of current will generally be represented as averages over a given time period or they may be represented as the root mean squared values in order to provide all positive number values.

Any one or more static probes in any location in the fluidized bed system may be determinative of the onset of a reactor discontinuity event.

Determination of the optimal amount of continuity additive may also be evidenced by other observations not limited to that of the measurement of static activity. For example, direct or indirect observation of heat fluctuations at various locations in a fluidized bed system can also be monitored and the ideal amount of continuity additive determined to minimize heat fluctuations.

Scavenger

Optionally, scavengers are added to the polymerization process. The present invention can be carried out in the presence of any suitable scavenger or scavengers. Scavengers are well known in the art.

In an embodiment of the invention, scavengers are organoaluminum compounds having the formula: $Al^3(X^3)_n(X^4)_{3-n}$, where $(X^3)$ is a hydrocarbyl having from 1 to about 20 carbon atoms; $(X^4)$ is selected from alkoxide or aryloxide, any one of which having from 1 to about 20 carbon atoms; halide; or hydride; and n is a number from 1 to 3, inclusive; or alkylaluminoxanes having the formula:

$$R'''_2Al^1O(R'''Al^1O)_mAl^1R'''_2$$

wherein each R''' is independently selected from the group consisting of $C_{1-20}$ hydrocarbyl radicals and m is from 3 to 50. Some non-limiting preferred scavengers useful in the current invention include triisobutylaluminum, triethylaluminum, trimethylaluminum or other trialkylaluminum compounds.

The scavenger may be used in any suitable amount but by way of non-limiting examples only, can be present in an amount to provide a molar ratio of Al:M (where M is the metal of the single site catalyst) of from about 20 to about 2000, or from about 50 to about 1000, or from about 100 to about 500. Generally the scavenger is added to the reactor prior to the catalyst and in the absence of additional poisons and over time declines to 0, or is added continuously.

Optionally, the scavengers may be independently supported. For example, an inorganic oxide that has been treated with an organoaluminum compound or alkylaluminoxane may be added to the polymerization reactor. The method of addition of the organoaluminum or alkylaluminoxane compounds to the support is not specifically defined and is carried out by procedures well known in the art.

A scavenger may optionally be added to the continuity additive prior to feeding a continuity additive to a reactor. Alternatively a scavenger may be combined with a continuity additive on route to a polymerization reactor or prior to combination of a continuity additive with a single site catalyst. For adding a scavenger to a continuity additive see, WO 2009/023111A1, U.S. Pat. No. 7,205,363 and U.S. Pat. Appl. No. 2009/0203859A1.

EXAMPLES

Continuity Additive

Atmer-163™ was obtained from CRODA CANADA LTD and dried over 3 Å molecular sieves for several days prior to use. Atmer-163 has as its main component, a mixture of C13 to C15 alkyldiethanolamines, $CH_3(CH_2)_xN(CH_2CH_2OH)_2$ where x is 12 to 14.

Larostat-902A™ was obtained from BASF CANADA and dried over 3 Å molecular sieves for several days prior to use. Larostat-902A is a multi component additive known to contain a) a mixture of fatty acid dialkanolamides derived from coco fatty acids, with lauric acid diethanolamide, $CH_3(CH_2)_{10}C(=O)N(CH_2CH_2OH)_2$, being the main species present by weight %; b) dodecylbenzenesulfonic acid, $CH_3(CH_2)_{11}C_6H_4SO_3H$; and c) the diethanolamine, N,N-bishydroxyethylamine, $HN(CH_2CH_2OH)_2$. Components b) and c) are present in a 1:1 molar ratio.

Single Site Polymerization Catalyst

The organometallic compound (i.e. the single site polymerization complex), $(1,2-(n-propyl)(C_6F_5)Cp)Ti(N=P(t-Bu)_3)Cl_2$ was made in a manner similar to the procedure given in U.S. Pat. No. 7,531,602. Sylopol 2408 silica purchased from Grace Davison was calcined by fluidizing with air at 200° C. for 2 hours and subsequently with nitrogen at 600° C. for 6 hours. 77.86 grams of the calcined silica was added to 300 mL of toluene and 215.86 g of a MAO solution containing 4.5 weight % Al purchased from Albemarle was added to the silica slurry quantitatively. The mixture was stirred for 1 hour at ambient temperature. The stirring rate should be such so as not to break-up the silica particles. 1.825 grams of $(1,2-(n-propyl)(C_6F_5)Cp)Ti(N=P(t-Bu)_3)Cl_2$ was weighed into a small vessel and 10 mL of toluene added. The metal complex solution was added to the silica slurry quantitatively. The resulting slurry was stirred for 2 hours at ambient temperature. The slurry was filtered, yielding a clear filtrate. The solid component was washed twice with toluene, and once with pentane. The final product was dried in vacuo to between 300 and 400 mtorr and stored under nitrogen until used. The finished catalyst had a pale yellow to pale orange colour.

General Polymerization Conditions

Continuous ethylene/1-hexene gas phase copolymerization experiments were conducted in a 56.4 L Technical Scale Reactor (TSR) in continuous gas phase operation using the above catalyst. Ethylene polymerizations were run at 80° C. with a total operating pressure of 300 pounds per square inch gauge (psig). Gas phase compositions for ethylene, 1-hexene and hydrogen were controlled via closed-loop process control to values of 50.0, 0.5-1.5, and 0.025-0.035 mole percent, respectively. Nitrogen constituted the remainder of the gas phase mixture (approximately 49 mole %). Typical production rate for these conditions is 2.0 to 3.0 kg of polyethylene per hour. Triethylaluminum (TEAL) is fed to the reactor continuously, as a 0.25 wt % solution in hexane (solution fed at about 10 ml/hr) in order to scavenge impurities. The residence time in the reactor is held constant at 1.5-3.0 hr, with a production rate range from 1.5-2.7 kg/hr. The catalyst metering device used for administering catalyst to the reactor is equipped with a probe that measures electrostatic charge carried by the solid material passing through a monitored tube leading catalyst to the reactor.

Example 1

Comparative

The supported single site catalyst (prepared as described above) was placed under a N2 blanket and using a dry catalyst feeder, a small shot of supported catalyst was added to a technical scale reactor via a feeding tube. Equilibrium polymerization conditions were established after a period of 4 residence times. Once equilibrium conditions were established, the static level in the reactor was measured over 6 hrs using a static probe (Correflow Electrostatic Monitor 3410 available from Progression). The static probe was located within the polymerization reactor. The polymerization and static results are provided in Table 1 and FIG. 1.

Example 2

This example was conducted in a manner analogous to Example 1, except that once equilibrium polymerization conditions were established, a continuity additive was fed to the reactor. The continuity additive was Atmer-163 which was diluted in hexanes to give a 1% by weight mixture and added via a manifold, into the reactor. In Example 2a, 25 ppm per mass of polymer produced of Atmer-163 was fed to the reactor. Once steady state is achieved, the reaction was held constant for another 3-4 residence times, and then the static level in the reactor was measured over 6 hours. In Example 2b, the level of Atmer-163 fed to the reactor was increased from 25 ppm to 100 ppm and then the static level was measured over 6 hours. An examination of the polymer product obtained during Atmer-163 addition revealed a free flowing powder without significant chunks or strings. Relevant data for these examples are provided in Table 1 and FIGS. 2 and 3.

Example 3

This example was conducted in a manner analogous to Example 1, except that once equilibrium polymerization conditions were established, a continuity additive was fed to the reactor. The continuity additive Larostat-902A was diluted in hexane to give a 1% by weight mixture and added via a manifold, into the reactor. In Example 3a, 25 ppm per mass of polymer produced of Larostat-902A was fed to the reactor and then the static level in the reactor was measured over 6 hrs. In Example 3b, the level of Larostat-902A fed to the reactor was increased from 25 ppm to 100 ppm of Larostat-902A and then the static level in the reactor was measured over 6 hrs. An examination of the polymer product obtained during Larostat-902A addition revealed a free flowing powder without significant chunks or strings. Relevant data for these examples are provided in Table 1 and FIGS. 4 and 5.

TABLE 1

Effect of Continuity Additive on Reactor Static Level/Catalyst Productivity

| Example | Continuity Additive | Productivity (gram polymer/ gram catalyst) | Static Level[1] | Static signal[2] | Fines Level[3] |
|---|---|---|---|---|---|
| 1 (comparative) | None | 3955 | High | 0.47 | 1.8 |
| 2a | 25 ppm Atmer 163 | 3653 | Low | 0.31 | 0.8 |
| 2b | 100 ppm Atmer 163 | 276 | Low | 0.29 | not measured |
| 3a | 25 ppm Larostat 902A | 3125 | Low | 0.19 | 0.4 |

TABLE 1-continued

Effect of Continuity Additive on Reactor Static Level/Catalyst Productivity

| Example | Continuity Additive | Productivity (gram polymer/ gram catalyst) | Static Level[1] | Static signal[2] | Fines Level[3] |
|---------|---------------------|-------------------------------------------|----------------|-----------------|----------------|
| 3b | 100 ppm Larostat 902A | 2139 | medium | 0.38 | 0.6 |

Note 1:
The static level was ranked qualitatively as high, low or medium based on the magnitude of the average current measured over a 6 hr period.

Note 2:
Static signal measurement on the Corestat 3410 static probe given as the integral of the static values divided by the number of seconds over which the measurement was taken (i.e. integral in static units of nanoamps per sec across 6 hours). To obtain this value, a static signal, in nanoamps, is recorded each second at the reactor wall. These signals are transformed into positive values by taking the absolute value of each number. The sum of the absolute values is divided by the number of seconds used to calculate the sum - this number is reported in Table 1.

Note 3:
Fines are measured as the weight percent of polymer which could be recovered using a 200 Mesh screen (75 μm).

As can be seen from the data provided in Table 1, and FIGS. 1, 4 and 5, the use of Larostat-902A is an effective way to reduce static in a gas phase reactor (compare Example 1 with Examples 3a and 3b). The reduction in static (and reactor fouling) observed with Larostat-902A is slightly better than or comparable to that observed with the more traditional continuity additive Atmer-163 (compare the data for Example 2a with the data for Example 3a in Table 1, as well as FIGS. 2 and 3 with FIGS. 4 and 5). Reduction of static is one way in which Larostat-902A improves reactor operability and reduces fouling. In addition, the data in Table 1 show that at similar and especially higher loadings, the Larostat-902A continuity additive had a smaller negative impact on catalyst productivity than did the use of Atmer-163 (compare the productivity for Example 2b with the productivity for Example 3b). Finally, the level of recoverable fines was lowest when using Larostat-902A as a continuity additive. Hence, a person skilled in the art will recognize from the data provided herein that the use of Larostat-902A with a single site polymerization catalyst (e.g. a phosphinimine polymerization catalyst) has the dual advantage of providing for reduced static and reactor fouling, while not dramatically impacting catalyst activity even when used at higher loadings (e.g. 100 ppm).

What is claimed is:

1. A process for polymerizing ethylene and optionally an alpha olefin in a reactor with at least one single site polymerization catalyst in the presence of a continuity additive, said continuity additive comprising:
   i) a fatty acid dialkanolamide,
   ii) an oil soluble sulfonic acid, and
   iii) a dialkanolamine;
       wherein the single site polymerization catalyst comprises a phosphinimine catalyst and a cocatalyst.

2. The process of claim 1 wherein the continuity additive comprises:
   i) at least one fatty acid diethanolamide having the formula $R^1C(=O)N(CH_2CH_2OH)_2$ where $R^1$ is a hydrocarbyl group having from 5 to 30 carbon atoms,
   ii) a benzene sulfonic acid having the formula $R^3C_6H_4SO_3H$, where $R^3$ is a hydrocarbyl group having from 6 to 30 carbon atoms, and
   iii) a dialkanolamine having the formula $HN((CH_2)_xOH)_2$ where x is independently an integer from 1 to 8.

3. The process of claim 2 wherein the continuity additive comprises:
   i) a mixture of two or more different fatty acid diethanolamides having the formula $R^1C(=O)N(CH_2CH_2OH)_2$, where $R^1$ is a hydrocarbyl group having anywhere from 5 to 30 carbon atoms,
   ii) a benzene sulfonic acid having the formula $R^3C_6H_4SO_3H$, where $R^3$ is a hydrocarbyl group having 6 to 22 carbon atoms, and
   iii) a dialkanolamine having the formula $HN((CH_2)_xOH)_2$, where x is 2 or 3.

4. The process of claim 3 wherein the mixture of two or more different fatty acid diethanolamides comprises compounds having the formula $R^1(C=O)N(CH_2CH_2OH)_2$ where $R^1$ is a hydrocarbyl group with 5, 7, 9, 11, 13, 15, or 17 carbon atoms and wherein diethanolamide compounds having hydrocarbyl groups with 5, 7, 9, 11, 13, 15 or 17 carbon atoms are represented at least once in the mixture.

5. The process of claim 3 wherein the benzene sulfonic acid and the dialkanolamine are present in a 1:1 molar ratio.

6. The process of claim 3 wherein the mixture of fatty acid diethanolamides comprises from 50-95 weight % of the continuity additive and the benzene sulfonic acid and the dialkanolamine together comprise from 5-50 weight % of the continuity additive.

7. The process of claim 1 wherein the phosphinimine catalyst has the formula:
   (L)(Pl)MX$_2$, where M is Ti, Zr or Hf; Pl is a phosphinimine ligand having the formula $R_3P=N-$, where R is independently selected from the group consisting of hydrogen, halogen, and $C_1$-$C_{20}$ hydrocarbyl; L is ligand selected from the group consisting of cyclopentadienyl, substituted cyclopentadienyl, indenyl, substituted indenyl, fluorenyl, and substituted fluorenyl; and X is an activatable ligand.

8. The process of claim 7 wherein the cocatalyst is selected from the group consisting of ionic activators, alkylaluminoxanes and mixtures thereof.

9. The process of claim 1 wherein the single site polymerization catalyst comprises an inert support.

10. The process of claim 9 wherein the phosphinimine catalyst has the formula:
    (L)(Pl)MX$_2$, where M is Ti, Zr or Hf; Pl is a phosphinimine ligand having the formula $R_3P=N-$, where R is independently selected from the group consisting of hydrogen, halogen, and $C_1$-$C_{20}$ hydrocarbyl; L is ligand selected from the group consisting of cyclopentadienyl, substituted cyclopentadienyl, indenyl, substituted indenyl, fluorenyl, and substituted fluorenyl; and X is an activatable ligand.

11. The process of claim 10 wherein the cocatalyst is selected from the group consisting of ionic activators, alkylaluminoxanes and mixtures thereof.

12. The process of claim 11 wherein the inert support is selected from the group consisting of silicas, aluminas, silica-aluminas, titanias, zirconias, magnesias, and mixtures thereof.

13. The process of claim 12 wherein the insert support is a silica support that has been treated with a source of $Zr(SO4)_2$ or $ZrO_2$.

14. The process of claim 1 wherein the continuity additive is present in from 1 ppm to 200 ppm based on the weight of the polymer produced.

15. The process of claim 1 wherein the continuity additive is present in from 1 to 100 ppm based on the weight of the polymer produced.

16. The process of claim 1 wherein the continuity additive is added directly to the reactor.

17. The process of claim 1 wherein the continuity additive is combined with the single site polymerization catalyst prior to entering the reactor.

18. The process of claim 1 wherein the continuity additive is: i) added directly to the reactor and ii) combined with the single site polymerization catalyst prior to entering the reactor.

19. The process of claim 1 wherein the continuity additive is added to a diluent prior to entering the reactor.

20. The process of claim 1 wherein the process is a gas phase process.

21. The process of claim 1 wherein the process is a gas phase process carried out in a fluidized bed reactor.

22. The process of claim 1 wherein ethylene is copolymerized with an alpha olefin having from 3-10 carbon atoms and ethylene comprises at least 75 wt % of the total amount of the ethylene and alpha olefin fed to the reactor.

23. The process of claim 1 wherein ethylene is copolymerized with 1-hexene and ethylene comprises at least 85 wt % of the total amount of the ethylene and alpha olefin fed to the reactor.

24. The process of claim 1 wherein the continuity additive is added during a polymerization reaction.

25. A process for polymerizing ethylene and optionally an alpha olefin in a reactor with at least one single site polymerization catalyst in the presence of a continuity additive, said continuity additive comprising:
  i) at least one fatty acid diethanolamide having the formula $R^1C(=O)N(CH_2CH_2OH)_2$ where $R^1$ is a hydrocarbyl group having from 5 to 30 carbon atoms;
  ii) a benzene sulfonic acid having the formula $R^3C_6H_4SO_3H$, where $R^3$ is a hydrocarbyl group having from 6 to 30 carbon atoms; and
  iii) a dialkanolamine having the formula $HN((CH_2)_xOH)_2$ where x is independently an integer of from 1 to 8;

wherein the at least one single site polymerization catalyst comprises a phosphinimine catalyst, a cocatalyst and an inert support and the phosphinimine catalyst has the formula: $(L)(Pl)MX_2$, where M is Ti, Zr or Hf; Pl is a phosphinimine ligand having the formula $R_3P=N-$, where R is independently selected from the group consisting of hydrogen, halogen, and $C_1$-$C_{20}$ hydrocarbyl; L is ligand selected from the group consisting of cyclopentadienyl, substituted cyclopentadienyl, indenyl, substituted indenyl, fluorenyl, and substituted fluorenyl; and X is an activatable ligand.

* * * * *